United States Patent
Oh et al.

(10) Patent No.: US 9,408,091 B2
(45) Date of Patent: Aug. 2, 2016

(54) WIRELESS RELAY COMMUNICATION SYSTEM, WIRELESS COMMUNICATION SYSTEM, MOBILE STATION APPARATUS DATABASE, BASE STATION APPARATUS, WIRELESS STATION APPARATUS, INTEGRATED CIRCUIT, COMPUTER PROGRAM, AND STORAGE MEDIUM

(75) Inventors: Wahoh Oh, Osaka (JP); Hiroshi Katsuragawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 197 days.

(21) Appl. No.: 14/240,465

(22) PCT Filed: Jun. 5, 2012

(86) PCT No.: PCT/JP2012/064450
§ 371 (c)(1),
(2), (4) Date: Feb. 24, 2014

(87) PCT Pub. No.: WO2013/031324
PCT Pub. Date: Mar. 7, 2013

(65) Prior Publication Data
US 2014/0213244 A1 Jul. 31, 2014

(30) Foreign Application Priority Data
Aug. 31, 2011 (JP) .................................. 2011-188139

(51) Int. Cl.
*H04B 7/15* (2006.01)
*H04W 24/02* (2009.01)
(Continued)

(52) U.S. Cl.
CPC ................. *H04W 24/02* (2013.01); *H04L 1/00* (2013.01); *H04L 67/125* (2013.01); *H04W 4/22* (2013.01);
(Continued)

(58) Field of Classification Search
CPC ......... H04W 8/22; H04W 8/24; H04W 8/245; H04W 16/24; H04W 16/26; H04W 24/00; H04W 24/02; H04W 28/0247; H04W 28/0234
USPC ................ 455/419, 423, 8–10, 11.1, 16, 560, 455/67.11, 226.1, 561
See application file for complete search history.

(56) References Cited

U.S. PATENT DOCUMENTS

2005/0094608 A1 5/2005 Yokota
2006/0251115 A1* 11/2006 Haque .................. H04B 7/2606
370/466

(Continued)

FOREIGN PATENT DOCUMENTS

JP 2005-79720 A 3/2005
JP 2011-66869 A 3/2011
(Continued)

OTHER PUBLICATIONS

Official Communication issued in International Patent Application No. PCT/JP2012/064450, mailed on Sep. 4, 2012.
(Continued)

Primary Examiner — Temica M Beamer
(74) Attorney, Agent, or Firm — Keating & Bennett, LLP

(57) ABSTRACT

Without introducing a complicated ad hoc network system, a transmission/reception signal of a mobile station apparatus is relayed using a communication protocol and a wireless access method defined in a current LTE standard. In a wireless relay communication system including a base station apparatus (12a), a mobile station apparatus (10a), and a wireless station apparatus (11a), the wireless station apparatus (11a) receives a mode switching control signal to switching a mode either to a mobile station apparatus mode in which the wireless station apparatus communicates as one mobile station apparatus (10a) with the base station apparatus (12a) or to a relay station apparatus mode in which the wireless station apparatus relays communication between the base station apparatus (12a) and the mobile station apparatus (10a). In a case where it is instructed via the mode switching control signal to switch the mode to the mobile station apparatus mode, the wireless station apparatus performs communication with the base station apparatus (12a) on behalf of one mobile station apparatus (10a). In a case where an instruction is made by the mode switching control signal to switch to the relay station apparatus mode, the wireless station apparatus relays communication between the base station apparatus (12a) and the mobile station apparatus (10a).

3 Claims, 18 Drawing Sheets

(51) Int. Cl.
  *H04W 4/22* (2009.01)
  *H04W 88/04* (2009.01)
  *H04L 29/08* (2006.01)
  *H04L 1/00* (2006.01)
  *H04W 84/18* (2009.01)
  *H04W 84/04* (2009.01)
  *H04W 88/06* (2009.01)

(52) U.S. Cl.
  CPC ............ *H04W 88/04* (2013.01); *H04W 84/047* (2013.01); *H04W 84/18* (2013.01); *H04W 88/06* (2013.01)

(56) References Cited

U.S. PATENT DOCUMENTS

| | | | |
|---|---|---|---|
| 2008/0045139 A1* | 2/2008 | Chen | H04W 16/14 455/3.04 |
| 2011/0151921 A1 | 6/2011 | Bonneville et al. | |
| 2012/0147811 A1 | 6/2012 | Ohyama et al. | |

FOREIGN PATENT DOCUMENTS

| | | |
|---|---|---|
| JP | 2011-524137 A | 8/2011 |
| WO | 2009/150158 A1 | 12/2009 |
| WO | 2011/019975 A1 | 2/2011 |

OTHER PUBLICATIONS

"3rd Generation Partnership Project;Technical Specification Group Radio Access Network; Evolved Universal Terrestrial Radio Access (E-UTRA); Physical Channels and Modulation (Release 10)", 3GPP TS 36.211 V10.1.0, Internet: <URL: http://www.3gpp.org/ftp/Specs/html-info/36211.htm>, retrieved on Aug. 5, 2011, 103 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)'", 3GPP TS 36.300 V10.3.0, Internet: <URL: http://www.3gpp.org/ftp/Specs/html-info/36300.htm>, retrieved on Aug. 5, 2011, 197 pages.

"3rd Generation Partnership Project; Technical Specification Group Radio Access Network; Evolved Universal Terrestrial Radio Access (E-UTRA); Physical layer for relaying operation (Release 10)." 3GPP TS 36.216 V10.2.0., Internet: <URL: http://www.3gpp.org/ftp/Specslhtml-info/36216.htm>, retrieved on Aug. 5, 2011, 16 pages.

* cited by examiner

WIRELESS RELAY COMMUNICATION SYSTEM, WIRELESS COMMUNICATION SYSTEM, MOBILE STATION APPARATUS DATABASE, BASE STATION APPARATUS, WIRELESS STATION APPARATUS, INTEGRATED CIRCUIT, COMPUTER PROGRAM, AND STORAGE MEDIUM

TECHNICAL FIELD

The present invention relates to a wireless relay communication system, a wireless communication system, a mobile station apparatus database, a base station apparatus, a wireless station apparatus, an integrated circuit, a computer program, and a computer-readable storage medium in which the computer program is stored.

BACKGROUND ART

An advanced wireless access method of cellular mobile communication and wireless network (hereinafter referred to as "Long Term Evolution (LTE)" or "Evolved Universal Terrestrial Radio Access (EUTRA)" is under discussion by 3rd Generation Partnership Project (3GPP).

In LTE, orthogonal frequency division multiplexing (OFDM) is used as a communication method in a downlink (DL) wireless communication from a base station apparatus to a mobile station apparatus.

As for a communication method for uplink (UL) wireless communication from a mobile station apparatus to a base station apparatus, single-carrier frequency division multiple access (SC-FDMA), which is a single-carrier transmission method, is used.

(LTE Radio Frame Format)

The format of a LTE radio frame is classified into Type 1 for a frequency division duplex (FDD) mode and Type 2 for a time division duplex (TDD) mode.

In each of these two modes, one radio frame includes 10 subframes, and one subframe includes two slots. One subframe includes a plurality of physical resource blocks (PRB). One physical resource block PRB includes 12 OFDM subcarriers (SC) disposed along a frequency axis and one slot which is a set of OFDM symbols disposed along a time axis.

A plurality of physical resource blocks PRB are contiguously disposed along the frequency axis. One physical resource block PRB includes a plurality of resource elements RE. One resource element RE includes one OFDM subcarrier SC along the frequency axis and one OFDM symbol along the time axis. A detailed description thereof may be founded, for example, in NPL 1, and thus a further description thereof is omitted here.

(LTE Relay Technology)

LTE uses a relay technology for expanding a service area, supporting a hot spot, handling a low-quality radio coverage, or the like. FIG. 17 is a diagram illustrating the LTE relay technology.

As illustrated in FIG. 17, mobile station apparatuses (user equipment) UE $1a$ to $1c$ communicate with relay station apparatuses $2a$ to $2c$ called relay nodes RN, while the relay station apparatuses $2a$ to $2c$ communicate with a main base station apparatus DeNB (Doner eNodeB) $3a$.

The relay station apparatuses $2a$ to $2c$ are wirelessly connected to the main base station apparatus $3a$ via a wireless backhaul links (Un interface) $4a$ to $4c$, and the mobile station apparatuses $1a$ to $1c$ are connected to the relay station apparatuses $2a$ to $2c$ via radio access links (Uu interface) $5a$ to $5c$.

The main base station apparatus $3a$ provides not only a relay connection to a plurality of relay station apparatuses $2a$ to $2c$ but it is also capable of directly communicating with the mobile station apparatus $1d$ via a radio access link $5d$ without using a relay connection. A detailed description thereof may be founded, for example, in NPL 2, NPL 3, or the like, and thus a further description thereof is omitted here.

(Configuration of LTE Physical Channel)

FIG. 18 is a diagram illustrating a configuration of LTE physical channels. As illustrated in FIG. 18, the base station apparatus $3a$ and the mobile station apparatus $1d$ are connected to each other via the radio access link $5d$. The radio access link $5d$ includes a plurality of LTE physical channels.

The LTE physical channels include physical downlink channels in a downlink used to transmit information from the base station apparatus $3a$ to the mobile station apparatus $1d$ and physical uplink channels in an uplink used to transmit information from the mobile station apparatus to the base station apparatus.

The physical downlink channels include downlink reference signals (DLRS), synchronization signals (SS), a physical broadcast channel (PBCH), a physical downlink control channel (PDCCH), a physical downlink shared channel (PDSCH), a physical multicast channel (PMCH), a physical control format indicator channel (PCFICH), and a physical hybrid automatic repeat request (HARQ) indicator channel PHICH.

The physical uplink channels include uplink reference signals (ULRS), a physical uplink control channel (PUCCH), a physical uplink shared channel (PUSCH), and a physical random access channel (PRACH). A description of detailed configurations and functions of respective physical channels may be found, for example, in NPL 2 or other LTE specifications, and thus a further description thereof is omitted here.

CITATION LIST

Non Patent Literature

NPL 1: 3GPP TS 36.211 V10.1.0. Technical Specification Group Radio Access Network; Evolved Universal Terrestrial Radio Access (E-UTRA); Physical Channels and Modulation (Release 10). [online]. 3rd Gene ration Partnership Project, 2011. [retrieved on 2011-08-05]. Retrieved from the Internet: <URL: http://www.3gpp.org/ftp/Specs/html-info/36 211.htm>.

NPL 2: 3GPP TS 36.300 V10.3.0. Technical Specification Group Radio Access Network; Evolved Universal Terrestrial Radio Access (E-UTR A) and Evolved Universal Terrestrial Radio Access Network (E-UTRAN); Overall description; Stage 2 (Release 10). [online]. 3rd Generation Partnership Project, 2011. [retrieved on 2011-08-05]. Retrieved from the Internet: <URL: http://www.3gpp.org/ftp/Specs/html-info/36300.htm>.

NPL 3: 3GPP TS 36.216 V10.2.0. Technical Specification Group Radio Access Network; Evolved Universal Terrestrial Radio Access (E-UTR A); Physical layer for relaying operation (Release 10). [online]. 3rd Generation Partnership Project, 2011. [retrieved on 2011-08-05]. Retrieved from the Internet: <URL: http://www.3gpp.org/ftp/Specs/html-info/36216.htm>.

SUMMARY OF INVENTION

Technical Problem

Mobile communication networks have a problem that a congestion occurs in a disaster. Besides, a power failure may occur or a communication facility may be damaged, which may cause a communication to be disrupted or may cause a base station apparatus to go into an off-the-area state. In such a situation, there is a possibility that an area appears in which communication is disrupted. In such a case, it is desirable to establish, by some means, a communication capability sustained area in which a mobile station apparatus is allowed to communicate with the outside.

In mountainous areas in which service areas covered by base station apparatuses are interspersed or in underpopulated areas or the like, there is a possibility that radio waves for wireless communication are weak at edges of service areas or attenuation of radio waves increases depending on a weather, or there is a possibility that an ambient radio wave interferers with radio wave for communication, which causes instability of the radio wave for communication. For example, in a case where a mountain accident or the like occurs due to a bad weather condition, it is desirable to temporarily provide a service expanded area to ensure communication.

Even in a service area of a base station apparatus, there is a possibility that an instability in a radio wave for wireless communication may occur due to a weak radio wave for wireless communication in the inside of a building, in the shadowing of a building, in an underground area, or the like, an increase in attenuation of radio waves caused by a weather condition, an occurrence of interference by an ambient radio wave, an increase in the number of users in a particular area, or the like. Even in such a situation, it is desirable to provide a radio-wave environment improved area in which high quality of radio waves is ensured.

In a case where an event is held at an edge of a service area and thus an increase in the number of users occurs, there is a possibility that an increase occurs in an interference with a nearby base station apparatus. Even in such a situation, it is desirable to provide an interference reduced area in which interference is reduced, in response to a notification of a request for reduction in interference from the nearby base station apparatus.

To handle the problems described above, use of an ad hoc network has been under discussion. The ad hoc network refers to a network formed by mutual communications among terminals without using communication infrastructure.

By establishing an ad hoc network in a communication capability sustained area, a service expanded area, a radio-wave environment improved area, or an interference reduced area, and relaying communication between a mobile station apparatus and a base station apparatus in each area via the ad hoc network, it becomes possible to maintain wireless connection.

In view of the above, problems currently under consideration include how to find a communication path via which a mobile station apparatus in each service area is allowed to be connected to a base station apparatus via another mobile station apparatus, how to manage locations of mobile station apparatuses in respective service areas, and how to realize a function of mutual cooperation and a function of relay between mobile station apparatuses.

In view of the above, it is an object of the present invention to provide a wireless relay communication system, a wireless communication system, a mobile station apparatus database, a base station apparatus, a wireless station apparatus, an integrated circuit, a computer program, and a computer-readable storage medium storing the computer program, which allow it to relay a transmission/reception signal of a mobile station apparatus by providing a communication capability sustained area, a service expanded area, a radio-wave environment improved area, or an interference reduced area using a wireless access method and a communication protocol prescribed in current LTE specifications without introducing a complicated ad hoc network system.

Solution to Problem

In order to solve the above-described problems, first technical means according to the present invention provides a wireless relay communication system including a base station apparatus, a mobile station apparatus, and a wireless station apparatus, the wireless station apparatus configured such that the wireless station apparatus receives a mode switching control signal to switch a mode either to a mobile station apparatus mode in which the wireless station apparatus communicates as one mobile station apparatus with the base station apparatus or to a relay station apparatus mode in which the wireless station apparatus relays a communication between the base station apparatus and the mobile station apparatus, in a case where it is instructed via the mode switching control signal to switch the mode to the mobile station apparatus mode, the wireless station apparatus communicates as the one mobile station apparatus with the base station apparatus, and in a case where it is instructed via the mode switching control signal to switch the mode to the relay station apparatus mode, the wireless station apparatus relays a communication between the base station apparatus and the mobile station apparatus.

In second technical means based on the first technical means according to the present invention, the base station apparatus transmits the mode switching control signal to the wireless station apparatus, and the wireless station apparatus receives the mode switching control signal transmitted from the base station apparatus.

In third technical means based on the first technical means according to the present invention, the wireless station apparatus receives the mode switching control signal transmitted from an external apparatus other than the base station apparatus or the mode switching control signal input by a user.

In fourth technical means based on the second technical means according to the present invention, the wireless station apparatus transmits, to the base station apparatus, mode switching capability information indicating that it is possible to switch a mode between the mobile station apparatus mode and the relay station apparatus mode, and the base station apparatus transmits the mode switching control signal to the wireless station apparatus based on the mode switching capability information.

In fifth technical means based on the second technical means according to the present invention, the wireless station apparatus transmits location information indicating a location of the wireless station apparatus to the base station apparatus, and the base station apparatus transmits the mode switching control signal to the wireless station apparatus based on the location information.

In sixth technical means based on the second technical means according to the present invention, the base station apparatus determines an area in which a communication is allowed between the base station apparatus and the mobile station apparatuses, selects a wireless station apparatus that is located in the area and that relays the communication between the base station apparatus and the mobile station apparatus, and transmits the mode switching control signal to the selected wireless station apparatus.

Seventh technical means according to the present invention provides a wireless communication system including a network control unit, a base station apparatus, a mobile station apparatus, and a wireless station apparatus, wherein the network control unit is configured to select a wireless station apparatus that is to relay a communication between the base station apparatus and the mobile station apparatus, and transmit a relay station apparatus establishment request signal to the base station apparatus that manages the wireless station apparatus, the base station apparatus in a case where the relay station apparatus establishment request signal is received, the base station apparatus transmits, to a wireless station apparatuses selected by the network control unit, a mode switching control signal to switch a mode of the wireless station apparatus from a mobile station apparatus mode in which the wireless station apparatus communicates as a mobile station apparatus with the base station apparatus to a relay station apparatus mode in which the wireless station apparatus relays a communication between the base station apparatus and the mobile station apparatus, and the wireless station apparatus is configured such that in a case where it is instructed via the mode switching control signal to switch the mode to the relay station apparatus mode, the wireless station apparatus relays a communication between the base station apparatus and the mobile station apparatus.

Eighth technical means according to the present invention provides a mobile station apparatus database used in managing relaying a communication between a base station apparatus and a mobile station apparatus, the mobile station apparatus database storing mode switching capability information and location information of each mobile station apparatus, the mode switching capability information indicating whether or not each mobile station apparatus has a mode switching capability to switch a mode either to a mobile station apparatus mode in which the mobile station apparatus communicates with the base station apparatus or to a relay station apparatus mode in which the mobile station apparatus relays a communication between the base station apparatus and the mobile station apparatus, wherein the mobile station apparatus that relays the communication is determined based on the mode switching capability information and the location information.

Ninth technical means according to the present invention provides a base station apparatus in a wireless relay communication system including the base station apparatus, a mobile station apparatus, and a wireless station apparatus, the wireless station apparatus comprising a mode switching control unit configured to switch a mode of the wireless station apparatus either to a mobile station apparatus mode in which the wireless station apparatus communicates as one mobile station apparatus with the wireless station apparatus or to a relay station apparatus mode in which the wireless station apparatus relays a communication between the base station apparatus and the mobile station apparatus.

In tenth technical means based on the ninth technical means according to the present invention, the base station apparatus receives, from the wireless station apparatus, mode switching capability information indicating that it is possible to switch the mode either to the mobile station apparatus mode or to the relay station apparatus mode, and the mode switching control unit switches the mode of the wireless station apparatus based on the mode switching capability information.

In eleventh technical means based on the ninth technical means according to the present invention, the base station apparatus receives location information indicating a location of the wireless station apparatus, and the mode switching control unit switching the mode of the wireless station apparatus based on the location information.

In twelfth technical means based on the ninth technical means according to the present invention, the mode switching control unit determines an area in which it is allowed to perform a communication between the base station apparatus and the mobile station apparatus, and the mode switching control unit switch the mode of the wireless station apparatus located in the area.

In thirteenth technical means based on one of ninth to twelfth means according to the present invention, the base station apparatus transmits to the wireless station apparatus a mode switching control signal to switch the mode of the wireless station apparatus.

Fourteenth technical means according to the present invention provides a wireless station apparatus in a wireless relay communication system including a base station apparatus, a mobile station apparatus, and the wireless station apparatus, the wireless station apparatus including a mode switching processing unit configured to switch a mode either to a mobile station apparatus mode in which the wireless station apparatus communicates as one mobile station apparatus with the base station apparatus or to a relay station apparatus mode in which the wireless station apparatus relays a communication between the base station apparatus and the mobile station apparatus, and a control unit configured to communicate as one mobile station apparatus with the base station apparatus in the mobile station apparatus mode and relay a communication between the base station apparatus and the mobile station apparatus in the relay station apparatus mode.

In fifteenth technical means based on the fourteenth technical means according to the present invention, the wireless station apparatus transmits, to the base station apparatus, mode switching capability information indicating that it is possible to switch the mode either to the mobile station apparatus mode or to the relay station apparatus mode.

In sixteenth technical means based on the fourteenth technical means according to the present invention, the wireless station apparatus transmits location information indicating a location of the wireless station apparatus to the base station apparatus.

In seventeenth technical means based on one of fourteenth to sixteenth means according to the present invention, the wireless station apparatus receives, from the base station apparatus, a mode switching control signal to switch the mode of the wireless station apparatus, and the mode switching processing unit switches the mode based on the mode switching control signal.

Eighteenth technical means according to the present invention provides an integrated circuit disposed in a base station apparatus in a wireless relay communication system including the base station apparatus, a mobile station apparatus, and a wireless station apparatus, the integrated circuit including a mode switching control unit configured to switch a mode of the wireless station apparatus either to a mobile station apparatus mode in which the wireless station apparatus communicates as one mobile station apparatus with the base station apparatus or to a relay station apparatus mode in which the wireless station apparatus relays a communication between the base station apparatus and the mobile station apparatus.

Nineteenth technical means according to the present invention provides an integrated circuit disposed in a wireless station apparatus in a wireless relay communication system including a base station apparatus, a mobile station apparatus, and the wireless station apparatus, the integrated circuit including a mode switching processing unit configured to switch a mode either to a mobile station apparatus mode in which the wireless station apparatus communicates as one mobile station apparatus with the base station apparatus or to a relay station apparatus mode in which the wireless station apparatus relays a communication between the base station apparatus and the mobile station apparatus, and a control unit configured to communicate as one mobile station apparatus with the base station apparatus in the mobile station apparatus mode and relay a communication between the base station apparatus and the mobile station apparatus in the relay station apparatus mode.

Twentieth technical means according to the present invention provides a computer program configured to control a base station apparatus in a wireless relay communication system including the base station apparatus, a mobile station apparatus, and a wireless station apparatus, the program causing a computer to execute a mode switching control step to switch a mode of the wireless station apparatus either to a mobile station apparatus mode in which the wireless station apparatus communicates as one mobile station apparatus with the wireless station apparatus or to a relay station apparatus mode in which the wireless station apparatus relays a communication between the base station apparatus and the mobile station apparatus.

Twenty-first technical means according to the present invention provides a computer program configured to control a wireless station apparatus in a wireless relay communication system including a base station apparatus, a mobile station apparatus, and the wireless station apparatus, the program causing a computer to execute a mode switching processing step to switch a mode of the wireless station apparatus either to a mobile station apparatus mode in which the wireless station apparatus communicates as one mobile station apparatus to the base station apparatus or to a relay station apparatus mode in which the wireless station apparatus relays communication between the base station apparatus and the mobile station apparatus.

Twenty-second technical means according to the present invention provides a computer-readable storage medium storing above-described the computer program.

Advantageous Effects of Invention

The present invention makes it possible to provide a communication capability sustained area, a service expanded area, a radio-wave environment improved area, or an interference reduced area as required thereby making it possible to relay a transmission/reception signal between a base station apparatus and a mobile station apparatus.

DESCRIPTION OF EMBODIMENTS

Embodiments of the present invention are described below with reference to drawings. First, types of relay station apparatuses classified according to the 3GPP standard are described below.

(Types of Relay Station apparatuses)

In the 3GPP standard, relay station apparatuses are classified into type 1 and type 2. In the type 1, a relay station apparatus transmits a physical layer-specific cell number PIC (physical cell ID) different from that of a base station apparatus, synchronization signals, and reference signals. A mobile station apparatus receives scheduling information and HARQ feedback directly from the relay station apparatus, and transmits a control channel of the mobile station apparatus to the relay station apparatus. When seen from the mobile station apparatus, the relay station apparatus of the type 1 seems to be a base station apparatus eNB (eNodeB).

On the other hand, a relay station apparatus of the type 2 does not have a unique cell number, and thus a mobile station apparatus is not capable of distinguishing whether a received signal is from a base station apparatus or from the relay station apparatus. In this scheme, it is allowed to transmit control information from a base station apparatus and transmit data via a relay station apparatus. This regard is being continually under discussion in 3GPP.

Relay station apparatuses are classified according to layers into layer-1 relay station apparatuses, layer-2 relay station apparatuses, and layer-3 relay station apparatuses.

The layer-1 relay station apparatus is a relay station apparatus of an amplifier and forward (AF) type which performs power amplification on a downlink reception radio frequency (RF) signal from a base station apparatus and transfers it to a mobile station apparatus. The layer-2 relay station apparatus is a relay station apparatus of a decode and forward (DF) type which demodulates and decodes a downlink RF signal from a base station apparatus and then again decodes and modulates it, and transmits a resultant signal to a mobile station apparatus. The layer-3 relay station apparatus is a relay station apparatus which performs, in addition to the demodulation and the decoding of a downlink RF signal from a base station apparatus, a process for reproducing user data and then again wirelessly transmitting the user data, and transmits, after performing encoding and modulation, the data to a mobile station apparatus. The type-1 relay station apparatus and the type-2 relay station apparatus a layer-2 relay station apparatus or a layer-3 relay station apparatus.

(First Embodiment)
(Configuration of Wireless Relay Communication System)

Figure 1:
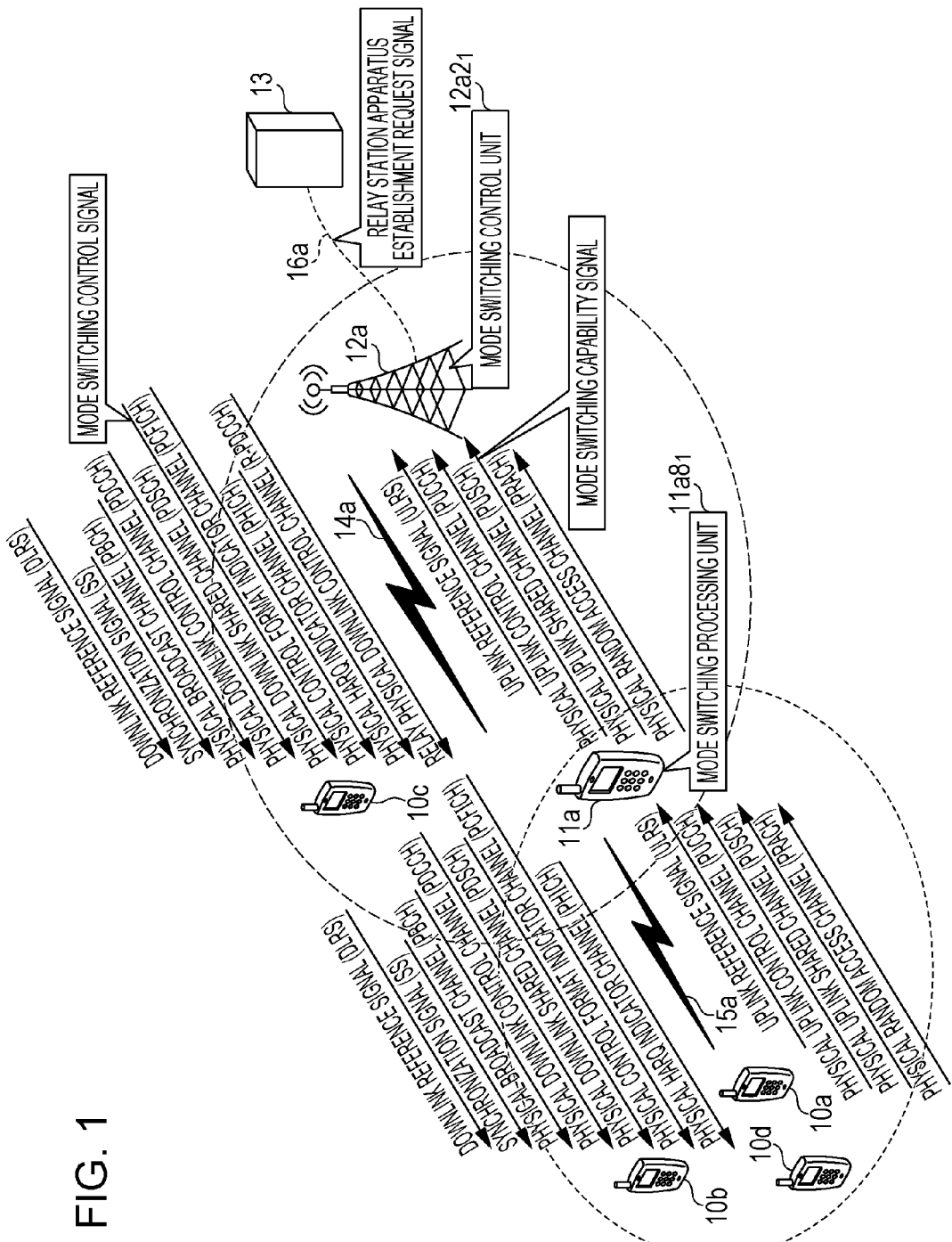
FIG. 1 is a conceptual diagram illustrating an example of a configuration of a wireless relay communication system according to a first embodiment of the present invention.

FIG. 1 is a conceptual diagram illustrating an example of a configuration of a wireless relay communication system according to a first embodiment of the present invention. This wireless relay communication system includes mobile station apparatuses $10a$ to $10d$, a wireless station apparatus $11a$, a base station apparatus $12a$, and a mobility management entity/serving gateway (MME/S-GW) unit $13$ serving as a network control unit of the wireless communication system.

The mobile station apparatuses $10a$ to $10d$ are conventional mobile station apparatuses UE (User Equipment). The mobile station apparatus $10c$ is connected to a base station apparatus $12a$ via a radio access link (Uu interface).

Figure 18:
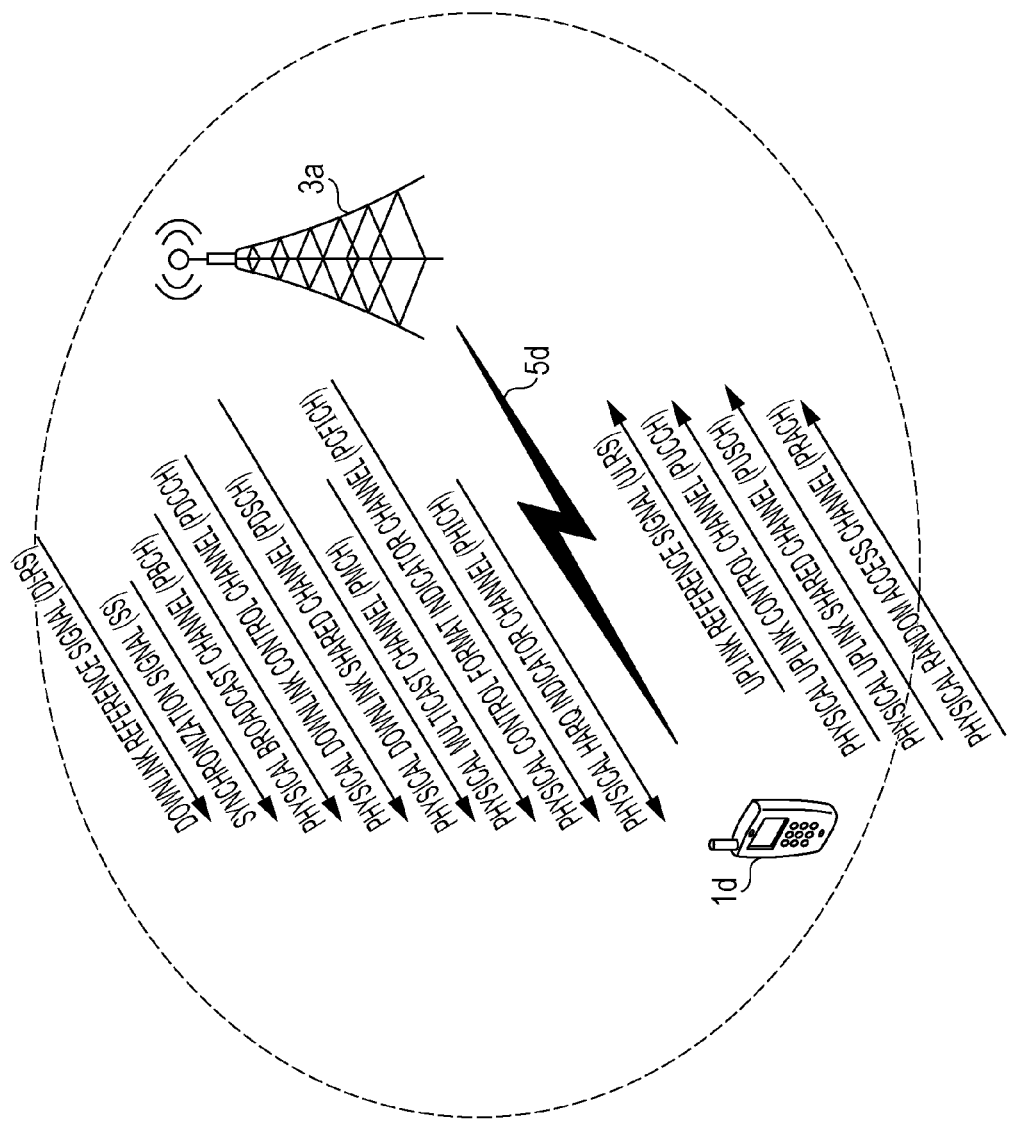
FIG. 18 is a diagram illustrating a configuration of LTE physical channels.

This radio access link (Uu interface) includes, as illustrated in FIG. 18, a plurality of downlink physical channels or signals, that is, DLRS, SS, PBCH, PDCCH, PDSCH, PCFICH, and PHICH, and a plurality of uplink physical channels or signals, that is, ULRS, PUCCH, PUSCH, and PRACH.

In a service area of the base station apparatus $12a$, the mobile station apparatus $10c$ and the base station apparatus $12a$ operate using a wireless access scheme, a communication protocol, and a signaling procedure according to the LTE specifications. On the other hand, the wireless station apparatus $11a$ according to the first embodiment of the present invention has both a function of a conventional mobile station apparatus UE and a function of a relay station apparatus RN such that the relay station apparatus RN function allows it to relay a communication between the mobile station apparatuses $10a$, $10b$, and $10d$ and the base station apparatus $12a$.

(Configuration of Base Station Apparatus)

Figure 2:
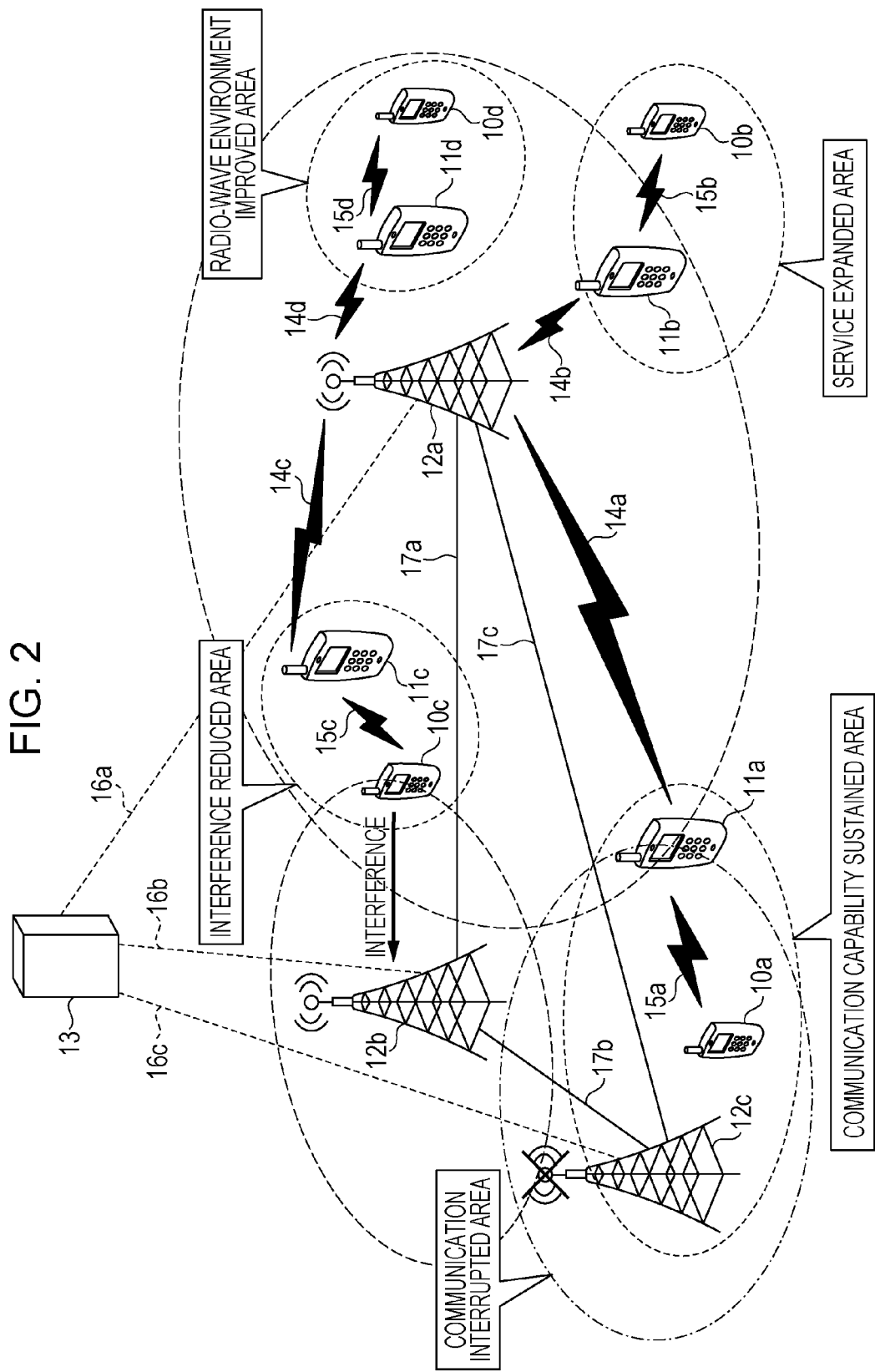
FIG. 2 is a diagram illustrating an example of a manner in which a relay area is formed in a wireless relay communication system according to the present invention.

FIG. 2 is a diagram illustrating a first example of a manner in which a relay area is formed in a wireless relay communication system according to the present invention. This wireless relay communication system includes mobile station apparatuses $10a$ to $10d$, wireless station apparatuses $11a$ to $11d$, base station apparatuses $12a$ to $12c$, and an MME/S-GW unit $13$.

When a communication capability sustained area, a service expanded area, a radio-wave environment improved area, or an interference reduced area is established, the base station apparatus $12a$ illustrated in FIG. 1 and FIG. 2 determines whether or not it is necessary to switch the mode between the mobile station apparatus mode and the relay station apparatus mode for the wireless station apparatuses $11a$ to $11d$ by using the mode switching control unit $12a2_1$ that controls the switching the mode between the mobile station apparatus mode and the relay station apparatus mode. Details of the mode switching control unit $12a2_1$ will be described later.

In a case where it is determined that it is necessary to switch the mode from the mobile station apparatus mode to the relay station apparatus mode, the base station apparatus $12a$ transmits a mode switching control signal to the wireless station apparatuses $11a$ to $11d$ to control the switching of the mode of the wireless station apparatuses $11a$ to $11d$ from the mobile station apparatus mode to the relay station apparatus mode.

The wireless station apparatuses $11a$ to $11d$ switch the mode from the mobile station apparatus mode to the relay station apparatus mode by using the mode switching processing unit $11a8_1$ that switches the mode either to the mobile station apparatus mode or to the relay station apparatus mode, and wireless station apparatuses $11a$ to $11d$ make reconnection to the base station apparatus $12a$ via the initial connection procedure in the relay station apparatus mode.

As illustrated in FIG. 1, the base station apparatus $12a$ serves as a main base station apparatus for the wireless station apparatuses $11a$ to $11d$ that have turned into the relay station apparatus mode, and the base station apparatus $12a$ establishes a connection with the wireless station apparatuses $11a$ to $11d$ via the wireless backhaul links (Un interfaces) $14a$ to $14d$.

The wireless station apparatuses $11a$ to $11d$ relay the radio access links (Uu interfaces) $15a$ to $15d$ of the mobile station apparatuses $10a$ to $10d$. Thus, the wireless station apparatuses $11a$ to $11d$ form a communication capability sustained area, a service expanded area, an interference reduced area, or a radio-wave environment improved area, as required.

In addition to the plurality of downlink physical channels or signals (DLRS, SS, PBCH, PDCCH, PDSCH, PCFICH, and PHICH) and the plurality of uplink physical channels or signals (ULRS, PUCCH, PUSCH, and PRACH) described above with reference to FIG. 18, the wireless backhaul links (Un interfaces) $14a$ to $14d$ also include a relay-physical downlink control channel R-PDCCH as will be described later.

Next, configurations of the base station apparatuses $12a$ to $12d$ are described below. The base station apparatuses $12a$ to $12d$ have the same configuration, and thus a description of the configuration is given below for the base station apparatus $12a$.

Figure 3:
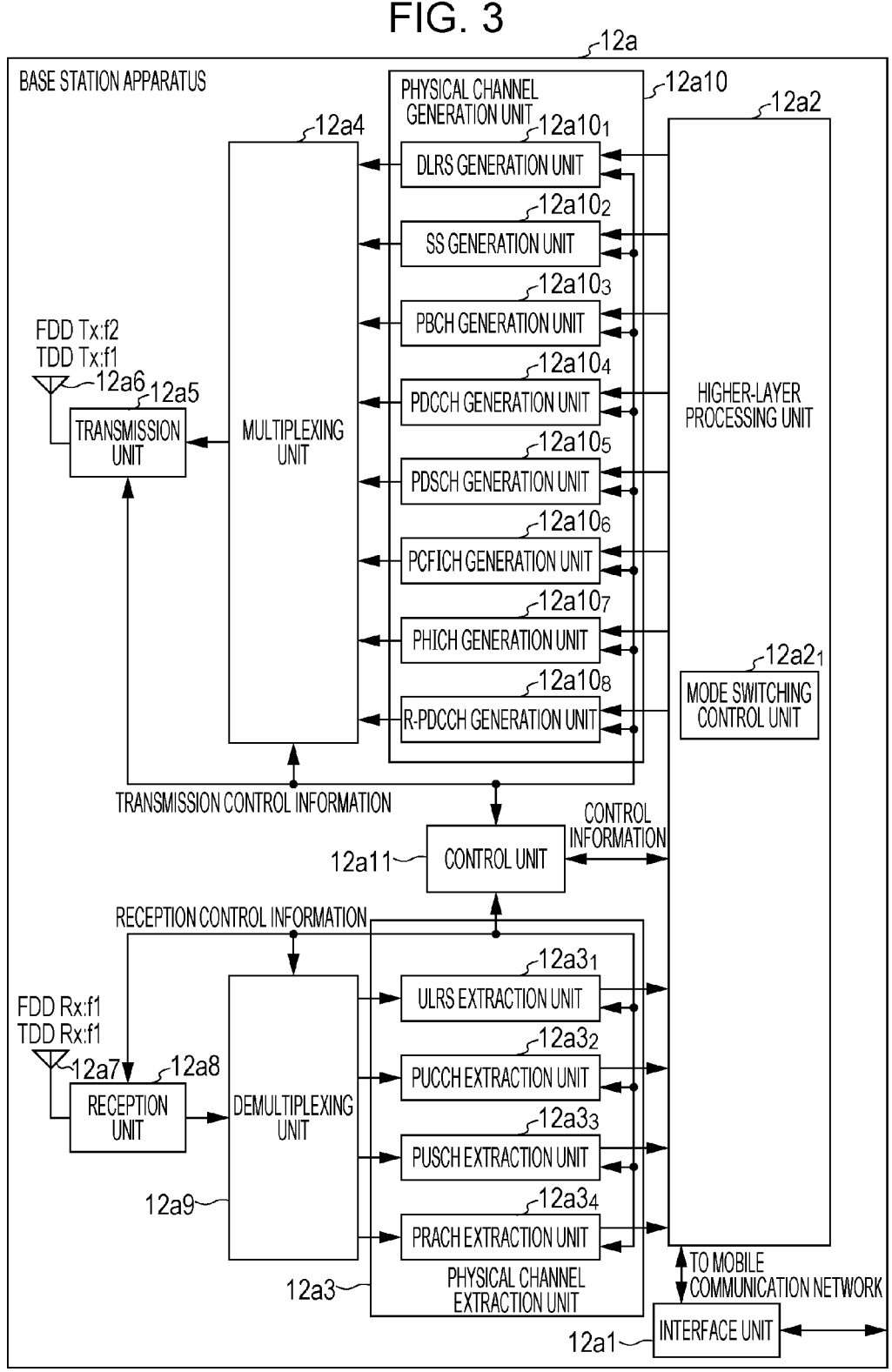
FIG. 3 is a conceptual diagram illustrating an example of a configuration of a base station apparatus according to the first embodiment of the present invention.

FIG. 3 is a conceptual diagram illustrating an example of a configuration of the base station apparatus $12a$ according to the first embodiment of the present invention. The base station apparatus $12a$ includes an interface unit $12a1$, a higher layer processing unit $12a2$, a physical channel extraction unit $12a3$, a multiplexing unit $12a4$, a transmission unit $12a5$, a transmitting antenna unit $12a6$, a receiving antenna unit $12a7$, a receiving unit $12a8$, a demultiplexing unit $12a9$, a physical channel generation unit $12a10$, and a control unit $12a11$.

The physical channel extraction unit $12a3$ includes an uplink reference signals (ULRS) extraction unit $12a3_1$, a physical uplink control channel (PUCCH) extraction unit $12a3_2$, a physical uplink shared channel (PUSCH) extraction unit $12a3_3$, and a physical random access channel (PRACH) extraction unit $12a3_4$.

The physical channel generation unit $12a10$ includes a downlink reference signals (DLRS) generation unit $12a10_1$, a synchronization signals (SS) generation unit $12a10_2$, a physical broadcast channel (PBCH) generation unit $12a10_3$, a physical downlink control channel (PDCCH) generation unit $12a10_4$, a physical downlink shared channel (PDSCH) generation unit $12a10_5$, a physical control format indicator channel (PCFICH) generation unit $12a10_6$, a physical hybrid ARQ indicator channel (PHICH) generation unit $12a10_7$, and a relay physical downlink control channel (R-PDCCH) generation unit $12a10_8$.

The interface unit $12a1$ connects to the MME/S-GW unit $13$, and transmits and receives user data and control data.

The higher layer processing unit 12a2 connects to the MME/S-GW unit 13 via the interface unit 12a1 and performs a generation process and an extraction process of user data and control data in a higher layer. The higher layer processing unit 12a2 also performs processing associated with various communication protocols and procedures.

The higher layer processing unit 12a2 includes a mode switching control unit $12a2_1$ that controls switching a mode between a mobile station apparatus mode and a relay station apparatus mode. The mode switching control unit $12a2_1$ determines whether or not to switch the mode from the mobile station apparatus mode to the relay station apparatus mode for the wireless station apparatuses 11a to 11d.

In a case where the mode switching control unit $12a2_1$ determines that it is necessary to switch to the relay station apparatus mode, the mode switching control unit $12a2_1$ transmits a mode switching control signal to the wireless station apparatuses 11a to 11d via the physical downlink shared channel PDSCH by radio resource control (RRC) signaling. The mode switching control signal will be described in further detail later.

The DLRS generation unit $12a10_1$ generates reference signal data corresponding to a resource element RE at each particular position using control data output from the higher layer processing unit 12a2 according to a predetermined rule, and outputs the generated reference signal data to the multiplexing unit 12a4.

In accordance with a cell number PIC output from the higher layer processing unit 12a2, the SS generation unit $12a10_2$ generates primary synchronization signal and secondary synchronization signal data corresponding to a resource element RE at each predetermined position according to a predetermined rule, and outputs the generated primary synchronization signal and secondary synchronization signal data to the multiplexing unit 12a4.

The PBCH generation unit $12a10_3$ generates higher-layer broadcast data corresponding to a resource element RE at each particular position according to a predetermined rule and using parameters (broadcast information, system information) output from the higher layer processing unit 12a2 and used in common by mobile station apparatuses in a cell. The PBCH generation unit $12a10_3$ outputs the generated broadcast data to the multiplexing unit 12a4.

The PDCCH generation unit $12a10_4$ generates higher-layer downlink control data corresponding to each a resource element RE at each particular position according to a predetermined rule and using paging data, user data, radio resource allocation information of (hybrid automatic repeat request (HARQ) data associated with the uplink user data, and PDCCH data such as uplink scheduling grant, which are output from the higher layer processing unit 12a2. The PDCCH generation unit $12a10_4$ outputs the generated downlink control data to the multiplexing unit 12a4.

The PDSCH generation unit $12a10_5$ generates higher-layer downlink shared data corresponding to resource block RB at each predetermined position according to a predetermined rule and using user data, control data, paging data, or the like output from the higher layer processing unit 12a2. The PDSCH generation unit $12a10_5$ outputs the generated downlink shared data to the multiplexing unit 12a4.

The PCFICH generation unit $12a10_6$ generates higher-layer physical control format indicator channel PCFICH data corresponding to a resource element RE at each particular position according to a predetermined rule and using data indicating the number of OFDM symbols occupied by PDCCH output from the higher layer processing unit 12a2. The PDCCH generation unit $12a10_4$ outputs the generated physical control format indicator channel PCFICH data to the multiplexing unit 12a4.

The PHICH generation unit $12a10_7$ generates physical HARQ indicator channel PHICH data corresponding to a resource element RE at each particular position according to a predetermined rule and using HARQ ACK/NACK data to uplink user data output from the higher layer processing unit 12a2. The PHICH generation unit $12a10_7$ outputs the generated physical HARQ indicator channel PHICH data to the multiplexing unit 12a4.

The R-PDCCH generation unit $12a10_8$ generates higher-layer physical downlink control channel R-PDCCH data corresponding to resource block RB at each predetermined position according to a predetermined rule and using relay station apparatus control data output from the higher layer processing unit 12a2, and outputs the generated physical downlink control channel R-PDCCH data to the multiplexing unit 12a4. The base station apparatus 12a transmits the control data to the relay station apparatuses controlled by the base station apparatus 12a.

Each of the above-described downlink physical channel generation units $12a10_1$ to $12a10_8$ performs scrambling processing, modulation processing, layer mapping processing, and precoding processing on the user data and the control data output from the higher layer processing unit 12a2. Details of these processes are prescribed in specifications of LTE described in, for example, NPL 1, and thus a further description thereof is omitted here.

The multiplexing unit 12a4 performs resource element mapping processing on the downlink physical channel data corresponding to the respective resource elements RE at predetermined positions or resource blocks RB transmitted from the respective downlink physical channel generation units $12a10_1$ to $12a10_8$, and further performs an inverse fast Fourier transform, inserting of a guard interval GI, and a digital-analog conversion (DAC) thereby generating an OFDM analog signal, which is output to the transmission unit 12a5.

The transmission unit 12a5 performs filtering processing such as bandwidth limiting and orthogonal modulation on the OFDM analog signal output from the multiplexing unit 12a4 thereby generating a particular RF signal. The transmission unit 12a5 further amplifies the RF signal to a predetermined output power level and outputs the resultant RF signal to the transmitting antenna unit 12a6.

Note that although FIG. 3 illustrates one transmitting antenna unit 12a6 and one transmission unit 12a5, a plurality of transmitting antenna units and a plurality of transmission units may be provided depending on the layer mapping processing performed by the respective downlink physical channel generation units $12a10_1$ to $12a10_8$.

The receiving unit 12a8 receives the particular RF signal of the uplink physical channel from the receiving antenna unit 12a7 and performs processing including amplification, frequency conversion, filtering, orthogonal demodulation, and the like. The receiving unit 12a8 outputs an uplink physical channel signal obtained as a result to the demultiplexing unit 12a9.

Note that although FIG. 3 illustrates one receiving antenna unit 12a7 and one receiving unit 12a8, a plurality of receiving antenna units and a plurality of receiving units may be provided depending on the layer mapping processing performed by respective uplink physical channel generation units $12a3_1$ to $12a3_4$ described later.

In FIG. 3, the transmitting antenna unit 12a6 and the receiving antenna unit 12a7 are provided separately. Alternatively, one antenna may be shared by providing an antenna diplexer DUP in the base station apparatus 12a in the FDD mode and an antenna switch SW in the base station apparatus 12a in the TDD mode.

The demultiplexing unit 12a9 performs an analog-digital conversion (ADC) on the uplink physical channel signals received from the mobile station apparatuses 10a to 10d, and further performs processing including an OFDM symbol timing detection, a guard interval GI removal, and a fast Fourier transform thereby generating baseband data. The demultiplexing unit 12a9 outputs the generated baseband data to the respective uplink physical channel extraction units $12a3_1$ to $12a3_4$.

The ULRS extraction unit $12a3_1$ extracts sounding reference signal (SRS) data corresponding to a resource element RE at each particular position from the baseband data according to a predetermined rule, and outputs the extracted sounding reference signal SRS data to the higher layer processing unit 12a2.

From the sounding reference signal SRS data, the higher layer processing unit 12a2 estimates OFDM symbol timing of the uplink channel and also estimates an uplink radio channel condition, and the higher layer processing unit 12a2 performs scheduling of uplink radio resources (allocation of resources, determination of the modulation method, the coding rate, and the like) via PUCCH.

The PUCCH extraction unit $12a3_2$ extracts physical uplink control channel PUCCH data corresponding to resource block RB at each predetermined position from the baseband data according to a predetermined rule, and outputs the extracted physical uplink control channel PUCCH data to the higher layer processing unit 12a2.

The uplink control channel PUCCH data includes downlink channel statement information CSI, channel quality indication (CQI), a precoding matrix indicator (PMI), and a rank indicator RI.

The uplink control channel PUCCH data includes information indicating ACK/NACK in HARQ to a downlink transport block, a scheduling request for assignment of a resource for use by a mobile station apparatus to transmit uplink data, and the like. The higher layer processing unit 12a2 performs various processes associated with communication protocols and procedures.

The USCH extraction unit $12a3_3$ extracts, physical uplink shared control channel PUSCH data corresponding to resource block RB at each predetermined position from the baseband data according to a predetermined rule, and outputs the extracted physical uplink shared control channel PUSCH data to the higher layer processing unit 12a2. The uplink shared channel PUSCH data mainly includes uplink user data, uplink control data, and control data associated with downlink reception quality, ACK/NACK, and the like.

The PRACH extraction unit $12a3_4$ extracts physical random access channel PRACH data corresponding to resource block RB at each predetermined position from the baseband data according to a predetermined rule, and outputs the extracted physical random access channel PRACH data to the higher layer processing unit 12a2.

The physical random access channel PRACH data includes information such as a scheduling request as to transmission data in a state in which an uplink control channel of the mobile station apparatus is not set yet, a request for transmission timing adjustment information necessary to adjust the uplink transmission timing with respect to the reception timing of the base station apparatus. The higher layer processing unit performs various processes associated with communication protocols and procedures.

Each of the above-described uplink physical channel extraction units $12a3_1$ to $12a3_4$ performs demodulation processing, decoding processing, descrambling processing, and the like. Details of these processes are prescribed in specifications of LTE, and thus a further description thereof is omitted here.

The control unit 12a11 controls each block. For example, the control unit 12a11 controls each block in terms of a timing control, a turning-on/off control, a measurement of an uplink radio channel condition, uplink and downlink radio resource scheduling, processing associated predetermined communication protocols and procedures, and the like.

The above explanation is given for a case where the base station apparatus 12a transmits and receives OFDM signals. However, the present invention is not limited to such a case. That is, functions of circuit blocks may be changed such that the base station apparatus 12a is capable of receiving an uplink signal in the form of SC-FDMA (Single Carrier Frequency Division Multiple Access) from the wireless station apparatus 11a, that is, the base station apparatus 12a may receive physical channel signals ULRS, PUCCH, PUSCH, and PRACH in the form of SC-FDMA of the uplink radio backhaul channel illustrated in FIG. 1.

For example, the base station apparatus 12a may receive physical channel signals ULRS, PUCCH, PUSCH, and PRACH using clustered discrete Fourier transform spread OFDM (SC-FDMA) signals in uplink contiguous frequency bands or SC-FDMA signals in uplink noncontiguous frequency bands. The base station apparatus 12a illustrated in FIG. 3 may be configured to adapt to either the FDD mode or the TDD mode, or the FDD/TDD dual mode.

(Configuration of Wireless Station Apparatus)

Next, configurations of the wireless station apparatuses 11a to 11d are described below. The wireless station apparatuses 11a to 11d are all configured in a similar manner, and thus the configuration is described below only for the wireless station apparatus 11a.

Figure 4:
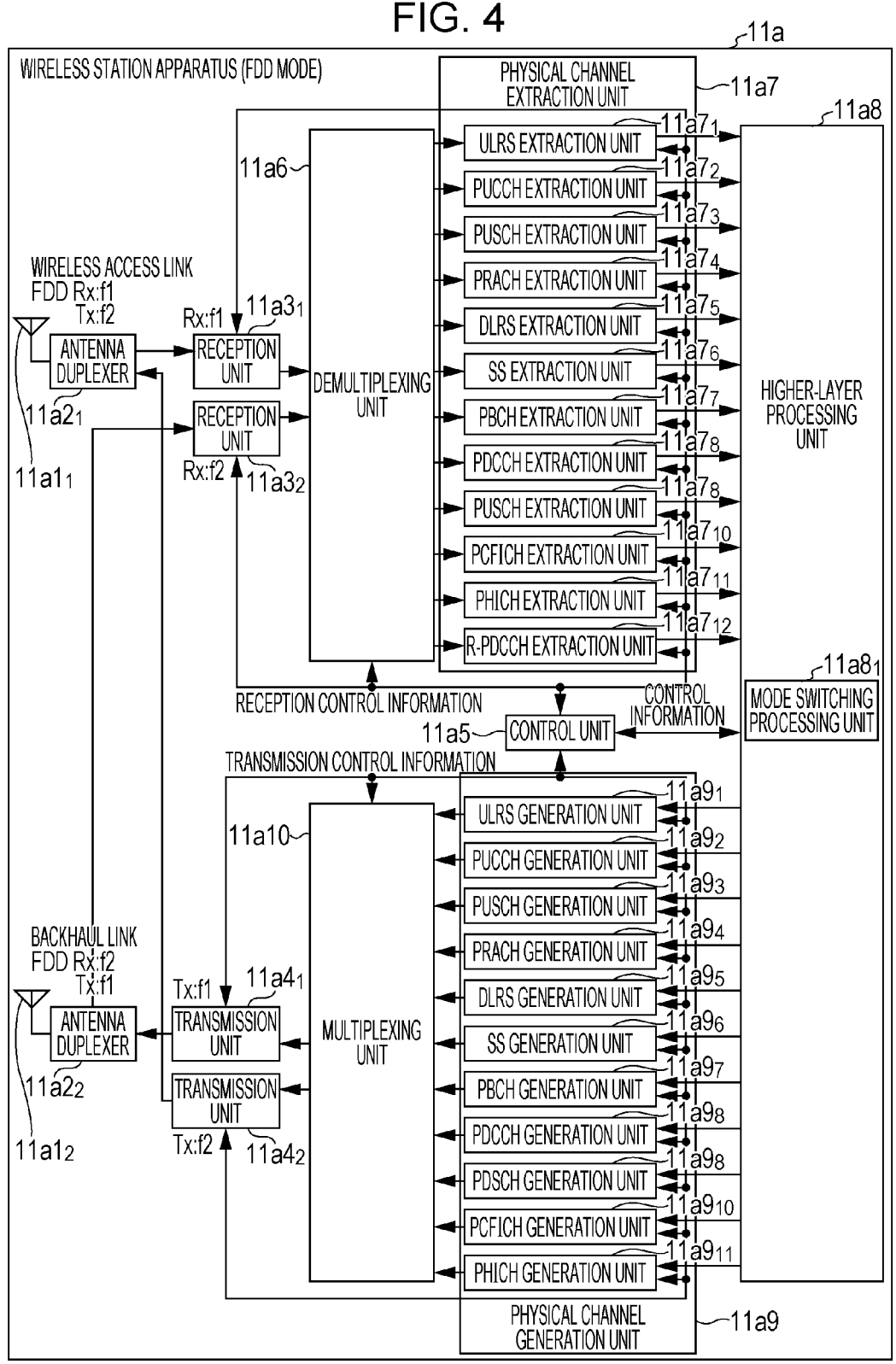
FIG. 4 is a diagram illustrating an example of a configuration of an FDD-mode wireless station apparatus according to the first embodiment of the present invention.

The wireless station apparatus 11a according to the first embodiment of the invention has both a user equipment (UE) function in a conventional mobile station apparatus and a relay node (RN) function in a relay station apparatus. FIG. 4 is a conceptual diagram illustrating an example of a configuration of an FDD-mode wireless station apparatus 11a according to the first embodiment of the present invention.

The FDD-mode wireless station apparatus 11a includes transmitting/receiving antenna units $11a1_1$ and $11a1_2$, antenna duplexers $11a2_1$ and $11a2_2$, receiving units $11a3_1$ and $11a3_2$, transmission units $11a4_1$ and $11a4_2$, a control unit 11a5, a demultiplexing unit 11a6, a physical channel extraction unit 11a7, a higher layer processing unit 11a8, a physical channel generation unit 11a9, and a multiplexing unit 11a10.

The physical channel extraction unit 11a7 includes an uplink reference signals (ULRS) extraction unit $11a7_1$, a physical uplink control channel (PUCCH) extraction unit $11a7_2$, a physical uplink shared channel (PUSCH) extraction unit $11a7_3$, a physical random access channel (PRACH) extraction unit $11a7_4$, a downlink reference signals (DLRS) extraction unit $11a7_5$, a synchronization signals (SS) extraction unit $11a7_6$, a physical broadcast channel (PBCH) extraction unit $11a7_7$, a physical downlink control channel (PDCCH) extraction unit $11a7_8$, a physical downlink shared channel (PDSCH) extraction unit $11a7_9$, a physical control format indicator channel (PCFICH) extraction unit $11a7_{10}$, a physical hybrid ARQ indicator channel (PHICH) extraction unit $11a7_{11}$, and a relay physical downlink control channel (R-PDCCH) extraction unit $11a7_{12}$.

The physical channel generation unit $11a9$ includes an uplink reference signals (ULRS) generation unit $11a9_1$, a physical uplink control channel (PUCCH) generation unit $11a9_2$, a physical uplink shared channel (PUSCH) generation unit $11a9_3$, a physical random access channel (PRACH) generation unit $11a9_4$, a downlink reference signals (DLRS) generation unit $11a9_5$, a synchronization signals (SS) generation unit $11a9_6$, a physical broadcast channel (PBCH) generation unit $11a9_7$, a physical downlink control channel (PDCCH) generation unit $11a9_8$, a physical downlink shared channel (PDSCH) generation unit $11a9_9$, a physical control format indicator channel (PCFICH) generation unit $11a9_{10}$, and a physical hybrid ARQ indicator channel (PHICH) generation unit $11a9_{11}$.

The transmitting/receiving antenna unit $11a1_1$ is used to transmit a radio signal to the conventional mobile station apparatuses $10a$ to $10d$ illustrated in FIG. 1 and to receive a radio signal from the mobile station apparatuses $10a$ to $10d$.

The received signal received by the transmitting/receiving antenna unit $11a1_1$ from the mobile station apparatuses $10a$ to $10d$ is input to the antenna duplexer $11a2_1$. On the other hand, the transmission signal to the mobile station apparatuses $10a$ to $10d$, which is output from the antenna duplexer $11a2_1$, is transmitted from the transmitting/receiving antenna unit $11a1_1$.

The receiving unit $11a3_1$ receives uplink signals of the mobile station apparatuses $10a$ to $10d$ output from the antenna duplexer $11a2_1$, that is, the receiving unit $11a3_1$ receives signals (with a center frequency f1 in the FDD mode) of physical channel signals ULRS, PUCCH, PUSCH, and PRACH transmitted via a radio access channel between the mobile station apparatuses $10a$ to $10d$ and the wireless station apparatus $11a$ illustrated in FIG. 1. The receiving unit $11a3_1$ performs amplification, frequency conversion, orthogonal modulation, filtering, and the like on each received signal and outputs the resultant signal to the demultiplexing unit $11a6$.

The transmitting/receiving antenna unit $11a1_2$ is used to transmit a radio signal to the base station apparatus $12a$ illustrated in FIG. 1, and to receive a radio signal from the base station apparatus $12a$. The received signal received by the transmitting/receiving antenna $11a1_2$ from the base station apparatus $12a$ is input to the antenna duplexer $11a2_2$. On the other hand, the transmission signal to the base station apparatus $12a$ output from the antenna duplexer $11a2_2$ is transmitted to the transmitting/receiving antenna unit $11a1_2$.

The receiving unit $11a3_2$ receives downlink signals of the base station apparatus $12a$ output from the antenna duplexer $11a2_2$, that is, the receiving unit $11a3_2$ receives signals (with a center frequency f2 in the FDD mode) of physical channels DLRS, SS, PBCH, PDCCH, PDSCH, PCFICH, PHICH, and R-PDCCH of a backhaul link between the wireless station apparatus $11a$ and the base station apparatus $12a$ illustrated in FIG. 1. The receiving unit $11a3_2$ performs amplification, frequency conversion, orthogonal demodulation, filtering, and the like on each signal and outputs the resultant signal to the demultiplexing unit $11a6$.

The demultiplexing unit $11a6$ performs an analog-digital conversion (ADC) on the signals from the mobile station apparatuses $10a$ to $10d$ and/or the base station apparatus $12a$, and further performs processing on each radio frame signal in terms of an OFDM symbol timing detection, guard interval GI removal, and a fast Fourier transform thereby generating baseband data. The demultiplexing unit $11a6$ outputs the generated baseband data to the respective physical channel extraction units $11a7_1$ to $11a7_{12}$.

The ULRS extraction unit $11a7_1$, the PUCCH extraction unit $11a7_2$, the PUSCH extraction unit $11a7_3$, and the PRACH extraction unit $11a7_4$ are respectively similar to the ULRS extraction unit $12a3_1$, the PUCCH extraction unit $12a3_2$|, the PUSCH extraction unit $12a3_2$, and the PRACH extraction unit $12a3_4$ of the base station apparatus $12a$ illustrated in FIG. 3, and thus a description thereof is omitted.

The DLRS extraction unit $11a7_5$ extracts cell specific reference signals (CRS) data corresponding to a resource element RE at each particular position from the baseband data according to a predetermined rule, and outputs the extracted cell specific reference signals CRS data to the higher layer processing unit $11a8$.

From the cell specific reference signals CRS data, the higher layer processing unit $11a8$ estimates an OFDM symbol timing of the downlink channel from the base station apparatus $12a$, and also estimates a downlink radio channel condition and measures radio wave conditions of other nearby base station apparatuses, and the like.

The SS extraction unit $11a7_6$ extracts, from the baseband data according to a predetermined rule, primary synchronization signal and secondary synchronization signal data corresponding to a resource element RE at each particular position, and outputs the extracted primary synchronization signal and secondary synchronization signal data to the higher layer processing unit $11a8$. The higher layer processing unit $11a8$ then identifies a cell number PIC of the base station apparatus $12a$ by performing a synchronization procedure.

The PBCH extraction unit $11a7_7$ extracts, from the baseband data according to a predetermined rule, higher-layer broadcast data corresponding to a resource element RE at each particular position, and outputs the extracted broadcast data to the higher layer processing unit $11a8$.

The PDCCH extraction unit $11a7_8$ extracts, from the baseband data according to a predetermined rule, PDCCH data including paging data and user data corresponding to a resource element RE at each particular position, radio resource allocation information of hybrid automatic repeat request (HARQ) data associated with the uplink user data, uplink scheduling grant, and the like, and the PDCCH extraction unit $11a7_8$ outputs the extracted PDCCH data to the higher layer processing unit $11a8$.

The PDSCH extraction unit $11a7_9$ extracts, from the baseband data according to a predetermined rule, user data, control data, paging data, and the like corresponding to a resource element RB at each particular position, and transmits the extracted user data, control data, paging data and the like to the higher layer processing unit $11a8$.

The PCFICH extraction unit $11a7_{10}$ extracts, from the baseband data according to a predetermined rule, extracts data indicating the number of OFDM symbols occupied by PDCCH corresponding to a resource element RE at each particular position, and outputs the extracted data indicating the number of OFDM symbols to the higher layer processing unit $11a8$.

The PHICH extraction unit $11a7_{11}$ extracts, from the baseband data according to a predetermined rule, HARQ ACK/NACK data associated with the uplink user data corresponding to a resource element RE at each particular position, and outputs the extracted ACK/NACK data to the higher layer processing unit $11a8$.

The R-PDCCH extraction unit $11a7_{12}$ extracts, from the baseband data according to a predetermined rule, relay station apparatus control data corresponding to a resource element RB at each particular position, and outputs the extracted control data to the higher layer processing unit $11a8$.

Each of the above-described physical channel extraction units $11a7_1$ to $11a7_{12}$ performs demodulation processing, decoding processing, descrambling processing, and the like. Details of these processes are prescribed in specifications of LTE, and thus a further description thereof is omitted here.

The higher layer processing unit $11a8$ performs generation and extraction processing of higher-layer user data and control data in cooperation with an application processing unit (not illustrated) or the like. The higher layer processing unit $11a8$ also performs various processes associated with communication protocols and procedures.

The higher layer processing unit $11a8$ includes a mode switching processing unit $11a8_1$ that controls switching of a mode between a mobile station apparatus mode and a relay station apparatus mode. In a case where the mode switching processing unit $11a8_1$ receives a mode switching control signal included in a radio resource control (RRC) signaling signal via a physical downlink shared channel PDSCH of the base station apparatus $12a$, the mode switching processing unit $11a8_1$ switches the mode of the wireless station apparatus $11a$ from the mobile station apparatus mode to the relay station apparatus mode. The mode switching control signal will be described in further detail later.

Using the control data output from the higher layer processing unit $11a8$ and according to a predetermined rule, the ULRS generation unit $11a9_1$ generates sounding reference signal SRS data corresponding to a resource element RE at each particular position by using the control data output from the higher layer processing unit $11a8$ and according to a predetermined rule, and the ULRS generation unit $11a9_1$ outputs the generated sounding reference signal SRS data to the multiplexing unit $11a10$.

The PUCCH generation unit $11a9_2$ generates physical uplink control channel PUCCH data corresponding to a resource block RB at each predetermined position by using higher-layer uplink control data output from the higher layer processing unit $11a8$ and according to a predetermined rule, and the PUCCH generation unit $11a9_2$ outputs the generated physical uplink control channel PUCCH data to the multiplexing unit $11a10$.

The PUSCH generation unit $11a9_3$ generates physical uplink shared control channel PUSCH data corresponding to a resource block RB at each predetermined position by using the higher-layer uplink shared data output from the higher layer processing unit $11a8$ and according to a predetermined rule, and the PUSCH generation unit $11a9_3$ outputs the generated physical uplink shared control channel PUSCH data to the multiplexing unit $11a10$.

The PRACH generation unit $11a9_4$ generates physical random access channel PRACH data corresponding to a resource block RB at each predetermined position by using the physical random access channel PRACH data output from the higher layer processing unit $11a8$ and according to a predetermined rule, and the PRACH generation unit $11a9_4$ outputs the generated physical random access channel PRACH data to the multiplexing unit $11a10$.

The DLRS generation unit $11a9_5$, the SS generation unit $11a9_6$, the PBCH generation unit $11a9_7$, the PDCCH generation unit $11a9_8$, the PDSCH generation unit $11a9_9$, the PCFICH generation unit $11a9_{10}$, and the PHICH generation unit $11a9_{11}$ are respectively similar to the DLRS generation unit $12a10_1$, the SS generation unit $12a10_2$, the PBCH generation unit $12a10_3$, the PDCCH generation unit $12a10_4$, the PDSCH generation unit $12a10_5$, the PCFICH generation unit $12a10_6$, and the PHICH generation unit $12a10_7$ in the base station apparatus $12a$ illustrated in FIG. 3, and thus a further description is omitted.

Each of the above-described physical channel generation units $11a9_1$ to $11a9_{12}$ performs processing on the user data and the control data from the higher layer processing unit $11a8$ in terms of scrambling processing, modulation processing, layer mapping processing, and precoding processing. Details of these processes are prescribed in specifications of LTE described in, for example, NPL 1, and thus a further description thereof is omitted here.

The multiplexing unit $11a10$ performs resource element mapping processing on each downlink physical channel data corresponding to a resource element RE at each particular position or resource block RB received from each of the above-described uplink physical channel generation units, and the multiplexing unit $11a10$ further performs an inverse fast Fourier transform, a guard interval (GI) insertion, and a digital-analog conversion (DAC) thereby generating an OFDM analog signal. The multiplexing unit $11a10$ outputs the generated OFDM analog signal to the transmission units $11a4_1$ and $11a4_2$ as a transmission signal to the mobile station apparatuses $10a$ to $10d$ and/or the base station apparatus $12a$.

The transmission unit $11a4_2$ performs filtering processing such as bandwidth limiting and orthogonal modulation on the downlink signals of the mobile station apparatuses $10a$ to $10d$ output from the multiplexing unit $11a10$, that is, OFDM analog signals of physical channels DLRS, SS, PBCH, PDCCH, PDSCH, PCFICH, and PHICH of the downlink radio access channel between the mobile station apparatuses $10a$ to $10d$ and the wireless station apparatus $11a$ illustrated in FIG. 1, thereby converting them into a particular RF signal. The transmission unit $11a4_2$ further amplifies the RF signal to a predetermined output power level and transmits the resultant RF signal (with a center frequency f2 in the FDD mode) to the antenna duplexer $11a2_1$.

The transmission unit $11a4_1$ performs filtering processing such as bandwidth limiting and orthogonal modulation on the uplink signals of the base station apparatus $12a$ output from the multiplexing unit $11a10$, that is, OFDM analog signals of physical channels ULRS, PUCCH, PUSCH, and PRACH of the backhaul link between the wireless station apparatus $11a$ and the base station apparatus $12a$ illustrated in FIG. 1 thereby converting them into a particular RF signal. The transmission unit $11a4_2$ further amplifies the RF signal to a predetermined output power level and transmits the resultant RF signal (with a center frequency f1 in the FDD mode) to the antenna duplexer $11a2_1$.

The control unit $11a5$ controls each block. For example, the control unit $11a5$ controls each block in terms of a timing control, a turning-on/off control, a measurement of uplink radio channel condition, radio resource scheduling, and processing associated predetermined communication protocols and procedures, and the like.

The above explanation is given for a case where the wireless station apparatus $11a$ transmits and receives OFDM signals. However, the present invention is not limited to such a case. That is, functions of circuit blocks may be changed such that the wireless station apparatus $11a$ is adapted to SC-FDMA (Single Carrier Frequency Division Multiple Access) in transmitting and receiving uplink signals of the mobile station apparatuses $10a$ to $10d$, that is, the physical channel signals ULRS, PUCCH, PUSCH, and PRACH of the uplink radio access channel between the mobile station apparatuses $10a$ to $10d$ and the wireless station apparatus $11a$ illustrated in FIG. 1, and uplink signals of the wireless station apparatus $11a$, that is, the physical channel signals ULRS, PUCCH, PUSCH, and PRACH of the uplink radio access channel between the wireless station apparatus $11a$ and the base station apparatus $12a$ illustrated in FIG. 1.

For example, the wireless station apparatus $11a$ may use an uplink continuous SC-FDMA signal or a noncontiguous SC- FDMA (Clustered Discrete Fourier Transform Spread OFDM) signal in transmitting and receiving the physical channel signals ULRS, PUCCH, PUSCH, and PRACH of the uplink radio access channel between the mobile station apparatuses 10a to 10d and the wireless station apparatus 11a, and the physical channel signals ULRS, PUCCH, PUSCH, and PRACH of the uplink radio access channel between the wireless station apparatus 11a and the base station apparatus 12a.

Figure 5:
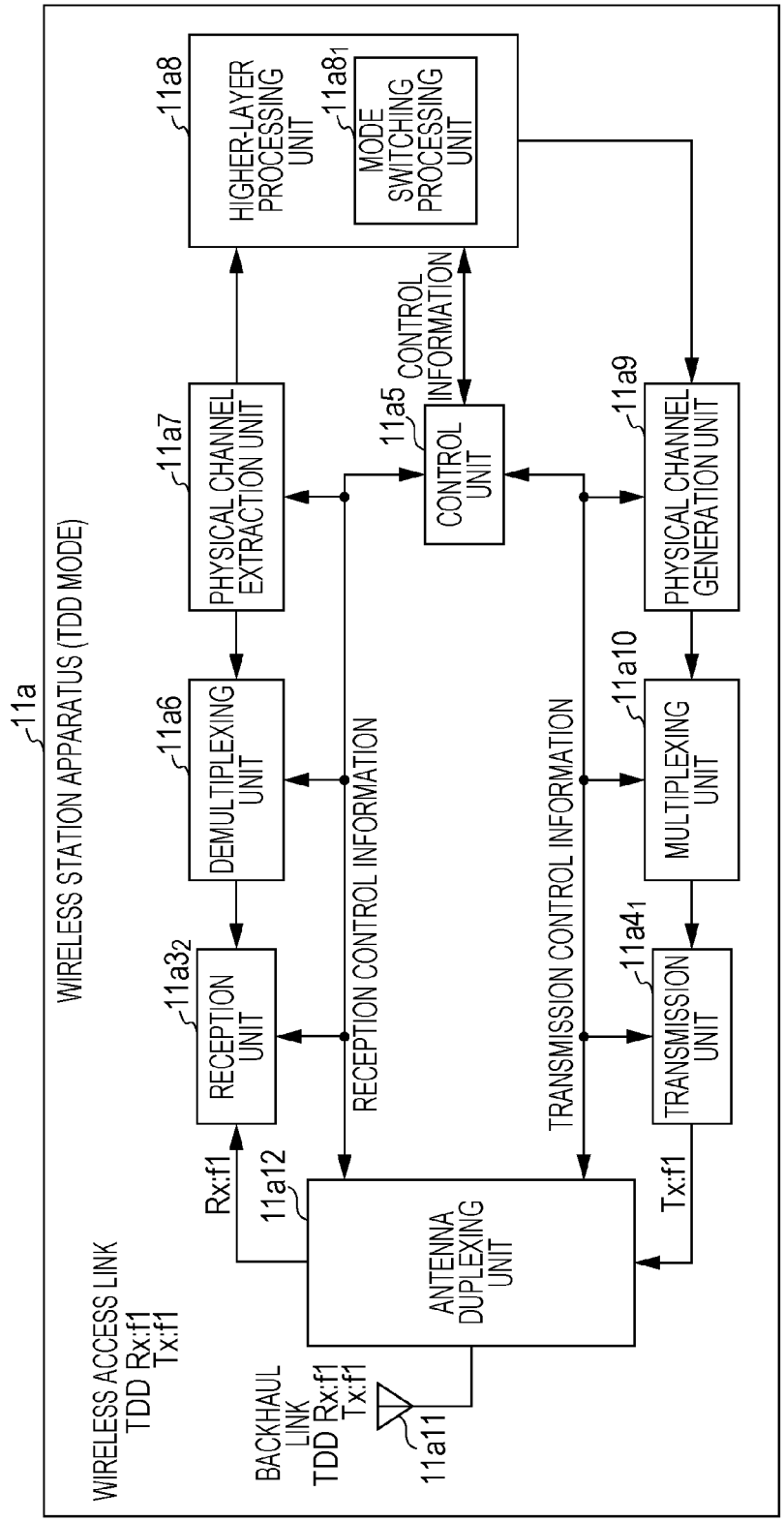
FIG. 5 is a diagram illustrating an example of a configuration of a TDD-mode wireless station apparatus according to the first embodiment of the present invention.

Next, an explanation is given below as to a configuration of a TDD-mode wireless station apparatus 11a according to the first embodiment of the present invention. FIG. 5 is a conceptual diagram illustrating an example of a configuration of a TDD-mode wireless station apparatus 11a according to the first embodiment of the present invention.

The configuration of the TDD-mode wireless station apparatus 11a is similar to the configuration of the FDD-mode wireless station apparatus 11a illustrated as an example in FIG. 4, except for the transmitting/receiving antenna unit 11a11 and the antenna duplexing unit 11a12, and thus a further detailed description thereof is omitted.

The transmitting/receiving antenna 11a11 is used to transmit and receive time-division multiplexed radio signals. More specifically, the transmitting/receiving antenna 11a11 is used to transmit a radio signal (with a center frequency f1 in the TDD mode) to the mobile station apparatuses 10a to 10d illustrated in FIG. 1 and receive a radio signal (with a center frequency f1 in the TDD mode) from the mobile station apparatuses 10a to 10d, or is used to transmit a radio signal (with a center frequency f1 in the TDD mode) to the base station apparatus 12a and receive a radio signal (with a center frequency f1 in the TDD mode) from the base station apparatus 12a.

The received signal received by the transmitting/receiving antenna 11a11 from the mobile station apparatuses 10a to 10d or the base station apparatus 12a is input to the antenna duplexing unit 11a12. On the other hand, the transmission signal output from the antenna duplexing unit 11a12 is transmitted from the transmitting/receiving antenna 11a11.

According to a control signal output from the control unit 11a5, the antenna duplexing unit 11a11 switches a processing unit connected to the transmitting/receiving antenna 11a11 between the receiving unit $11a3_2$ and the transmission unit $11a4_1$.

(Processing Procedure of Mode Switching Process in Base Station Apparatus)

Figure 6:
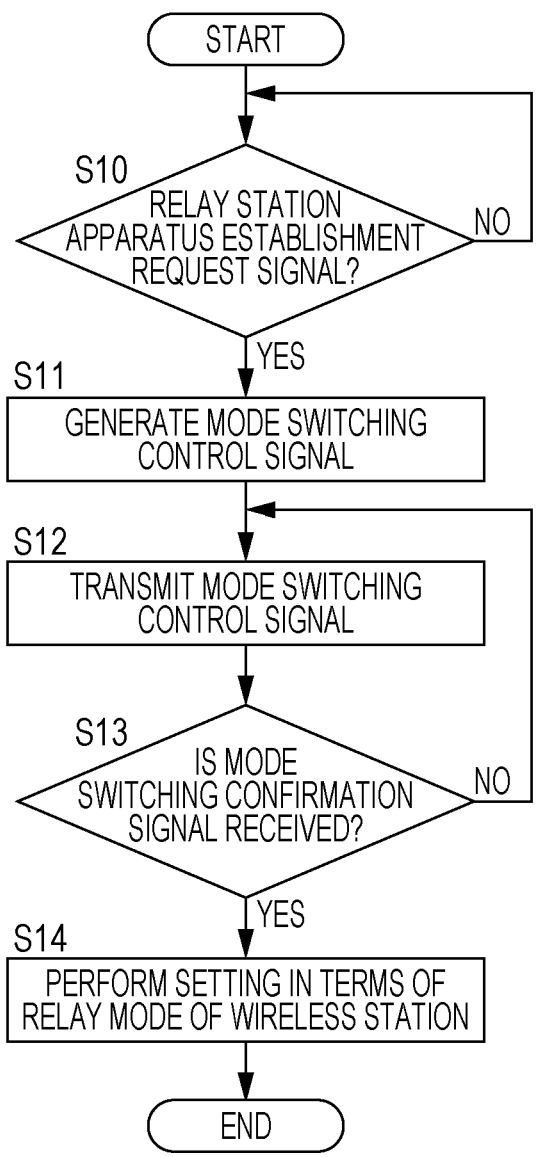
FIG. 6 is a flow chart illustrating an example of a processing procedure of a mode switching process in a base station apparatus.

Next, a processing procedure of a mode switching process in the base station apparatus 12a is described below. FIG. 6 is a flow chart illustrating an example of a processing procedure of a mode switching process in the base station apparatus 12a.

As illustrated in FIG. 3, the higher layer processing unit 12a2 of the base station apparatus 12a includes a mode switching control unit $12a2_1$ that switches the mode between the mobile station apparatus mode and the relay station apparatus mode. The mode switching control unit $12a2_1$ is realized by executing a computer program by hardware such as an integrated circuit and/or a processor. An example of a wireless relay system including wireless station apparatuses 11a to 11d is illustrated in FIG. 2.

(Step S10 in FIG. 6)

First, the mode switching control unit $12a2_1$ included in the higher layer processing unit 12a2 of the base station apparatus 12a determines whether a relay station apparatus establishment request signal requesting for establishment of a relay station apparatus has been received from the MME/S-GW unit 13.

In a case where a relay station apparatus establishment request signal has not been received (NO in step S10), the processing flow returns to step S10, in which the mode switching control unit $12a2_1$ makes a determination repeatedly as to whether a relay station apparatus establishment request signal has been received. In a case where a relay station apparatus establishment request signal has been received (YES in step S10), processing in step S11 is performed.

The MME/S-GW unit 13 transmits a relay station apparatus establishment request signal to the base station apparatus 12a to request to establish a relay station apparatus to provide a communication capability sustained area, a service expanded area, a radio-wave environment improved area, or an interference reduced area. As illustrated in FIG. 1, the interface unit 12a1 of the base station apparatus 12a receives, from the MME/S-GW unit 13, the relay station apparatus establishment request signal transmitted from the MME/S-GW unit 13 via an interface (S1) 16a between the base station apparatus 12a and the MME/S-GW unit 13.

The relay station apparatus establishment request signal includes information indicating a signaling ID (signaling ID), a mobile station apparatus number (UE temporary ID), and the like. The mode switching control unit 12a21 identifies the signaling ID and determines whether there is a relay station apparatus establishment request signal.

For example, in a case where an earthquake or a tsunami occurs, the MME/S-GW unit 13 receives earthquake/tsunami occurrence information or failure information of the base station apparatus 12c from an external apparatus, and makes a determination based on location information included in the received information as to a location where to establish a communication capability sustained area. More specifically, the MME/S-GW unit 13 receives, from an external apparatus, information indicating a location where an earthquake/tsunami occurs, or information indicating a location of a failed base station apparatus 12c, and the MME/S-GW unit 13 determines that a communication capability sustained area is to be established at that location.

The MME/S-GW unit 13 then selects a wireless station apparatus 11a operable in the relay station apparatus mode and existing at the location where the communication capability sustained area is to be established, based on mode switching capability information of wireless station apparatuses registered in advance in mobile station apparatus (including wireless station apparatuses) database (information indicating whether each wireless station apparatus has a capability of switching its mode between the mobile station apparatus mode and the relay station apparatus mode), location information of wireless station apparatuses registered/managed by the mobile station apparatus database, and the like.

The MME/S-GW unit 13 then determines whether the selected wireless station apparatus 11a is in a standby mode (RRC IDLE Mode) or a wireless connection mode (RRC CONNECTED Mode). In a case where it is in the standby mode, a calling process is performed to cause the wireless station apparatus 11a to go into the wireless connection mode. In a case where the wireless station apparatus 11a is in the wireless connection mode, a relay station apparatus establishment request signal is transmitted to the base station apparatus 12a that manages communication of the wireless station apparatus 11a.

Furthermore, the MME/S-GW unit 13 transmits a relay station apparatus establishment request signal to the base station apparatus 12a such that a service expanded area as illustrated in FIG. 2 is formed. For example, first, the MME/S-GW unit 13 receives, from an external apparatus, information of a change in a weather condition, information of an incident/accident, a request for police/fire/rescue dispatch, or the like.

From location information included in such information, the MME/S-GW unit 13 determines a location at which a service expanded area is established. More specifically, when the MME/S-GW unit 13 receives, from an external apparatus, information of a location where a change in weather condition occurs, information of a location where an incident/accident occurs, information of a location to which police/fire/rescue dispatch is requested, or the like, the MME/S-GW unit 13 determines that a service expanded area is to be established at the location.

Thereafter, based on mode switching capability information of wireless station apparatuses registered in advance in the mobile station apparatus database, location information of wireless station apparatuses registered and managed by the mobile station apparatus database, the MME/S-GW unit 13 selects a wireless station apparatus 11*b* that is capable of operating in the relay station apparatus mode and that is at a location suitable for establishing a service expanded area.

The MME/S-GW unit 13 further determines whether the selected wireless station apparatus 11*b* is in a standby mode. More specifically, based on the mobile station apparatus database, the MME/S-GW unit 13 determines whether the selected wireless station apparatus 11*b* is in the standby mode or the wireless connection mode. In the case where the selected wireless station apparatus 11*b* is in the standby mode, the MME/S-GW unit 13 performs a calling process to switch the wireless station apparatus 11*b* into the wireless connection mode. In a case where the wireless station apparatus 11*b* is in the wireless connection mode, the MME/S-GW unit 13 transmits a relay station apparatus establishment request signal to a base station apparatus 12*a* that manages communication of the wireless station apparatus 11*b*.

The MME/S-GW unit 10 also transmits a relay station apparatus establishment request signal to the base station apparatus 12*a* such that an interference reduced area illustrated in FIG. 2 is configured. For example, the MME/S-GW unit 13 receives information of an interference report or the like transmitted from the base station apparatus 12*b*, and, based on location information included in the received information, determines a location More specifically, the MME/S-GW unit 13 receives information of a location where interference occurs from the base station apparatus 12*b*, and determines that this location is a location where an interference reduced area is to be established.

Subsequently, based on mode switching capability information of wireless station apparatuses registered in advance in the mobile station apparatus database, location information of the wireless station apparatus registered and managed by the mobile station apparatus database, or the like, the MME/S-GW unit 13 selects a wireless station apparatus 11*c* that is capable of operating in the relay station apparatus mode and that is at a location suitable for establishing the interference reduced area.

Furthermore, based on the mobile station apparatus database, the MME/S-GW unit 13 determines whether the selected wireless station apparatus 11*c* is in the standby mode or the wireless connection mode. In a case where the selected wireless station apparatus 11*c* is in the standby mode, the MME/S-GW unit 13 performs a calling process to switch the wireless station apparatus 11*c* into the wireless connection mode. In a case where the wireless station apparatus 11*c* is in the wireless connection mode, the MME/S-GW unit 13 transmits a relay station apparatus establishment request signal to the wireless station apparatus 11*c*.

Furthermore, the MME/S-GW unit 10 transmits a relay station apparatus establishment request signal to the base station apparatus 12*a* such that a radio-wave environment improved area illustrated in FIG. 2 is formed. For example, the MME/S-GW unit 13 first receives from the base station apparatus 12*a* a reconnection request, information as communication quality, or the like of a plurality of mobile station apparatuses 10*c* and 10*d* located in a service area of the base station apparatus 12*a*, and then the MME/S-GW unit 13 makes a determination from the location information included in the received information as to where a radio-wave environment improved area is to be provided. More specifically, the MME/S-GW unit 13 receives from the base station apparatus 12*a* information of the locations of the mobile station apparatuses 10*c* and 10*d* that have issued a reconnection request or the mobile station apparatuses 10*c* and 10*d* having communication quality lower than a predetermined level, and the MME/S-GW unit 13 determines the locations thereof as locations where radio-wave environment improved areas are to be established.

Subsequently, based on mode switching capability information of wireless station apparatuses registered in advance in the mobile station apparatus database, location information of wireless station apparatuses registered/managed by the mobile station apparatus database, and the like, the MME/S-GW unit 13 selects a wireless station apparatus 11*d* that is capable of operating in the relay station apparatus mode and that is at a location suitable for establishing the radio-wave environment improved area.

Furthermore, based on the mobile station apparatus database, the MME/S-GW unit 13 determines whether the selected wireless station apparatus 11*d* is in the standby mode or the wireless connection mode. In a case where the selected wireless station apparatus 11*d* is in the standby mode, the MME/S-GW unit 13 performs a calling process to switch the wireless station apparatus 11*d* into the wireless connection mode. In a case where the wireless station apparatus 11*d* is in the wireless connection mode, the MME/S-GW unit 13 transmits a relay station apparatus establishment request signal to a base station apparatus 12*a* that manages communication of the wireless station apparatus 11*d*.

(Step S11 in FIG. 6)

In a case where a relay station apparatus establishment request signal is received (YES in step S11), the mode switching control unit $12a2_1$ generates a mode switching control signal. More specifically, the mode switching control unit $12a2_1$ decodes the network control signal transmitted from the MME/S-GW unit 13, and detects a signaling ID (Signaling ID) from the decoded control signal. In a case where the detected signaling ID corresponds to a relay station apparatus establishment request signal, the mode switching control unit $12a2_1$ extracts a mobile station apparatus number (UE temporary ID) from the relay station apparatus establishment request signal.

The mode switching control unit $12a2_1$ then generates a mode switching control signal to be transmitted to a wireless station apparatus 11*a* to 11*d* that is identified by the mobile station apparatus number and that is in the wireless connection mode. For example, the mode switching control unit $12a2_1$ uses a format of the mode switching control signal obtained by adding the mode switching control signal to a RRC connection reconfiguration message which is one of RRC messages defined in the LTE specifications (TS 35.331).

The mode switching control signal includes, for example, one bit (or a code including a plurality of bits) indicating that the mode is to be switched on or off, and/or a bit sequence indicating a relay station number RN ID (RN Indication).

A mode switching control signal RN-Mode and a RN-Indication message are added to a RRC Connection Reconfiguration message described in abstract syntax notation ASN, for example, as described below.

```
-- ASN1START
Max-RN-Id INTEGER ::= 64 -- maximum relay station number RN
ID
RRCConnectionReconfiguration ::= SEQUENCE {
......
RN-ModeENUMERATED {true}, -- mode switch on (true)/off
RN-Indication INTEGER (1..Max-RN-Id), -- relay station
number RN ID
}
-- ASN1STOP
```

The mode switching control signal is subjected to an ASN encoding process executed by the higher layer processing unit $12a8$ thereby being coded together with the RRC connection reconfiguration message. As a result, an information bit sequence is generated and input to the PDSCH generation unit $12a10_5$.
(Step S12 in FIG. 6)

The base station apparatus $12a$ then transmits the mode switching control signal to the selected wireless station apparatuses $11a$ to $11d$. For example, the base station apparatus $12a$ transmits the RRC connection reconfiguration message including the mode switching control signal to the wireless station apparatus $11a$ to $11d$.

More specifically, an information bit sequence of the RRC connection reconfiguration message input to the PDSCH generation unit $12a10_5$ of the base station apparatus $12a$ is subjected to a scrambling processing, a modulation processing, a layer mapping processing, and a precoding processing, and mapped by the multiplexing unit $12a4$ to a downlink physical channel PDSCH corresponding to a resource element RE or a resource block RB corresponding to each predetermined position. The resultant information bit sequence is then transmitted to the wireless station apparatuses $11a$ to $11d$ via the transmission unit $12a5$.
(Step S13 in FIG. 6)

Thereafter, the mode switching control unit $12a2_1$ determines whether a mode switching confirmation signal is received from the selected wireless station apparatuses $11a$ to $11d$. For example, as a format of the mode switching control signal, it is allowed to use a RRC connection reconfiguration message which is one of RRC messages defined in the LTE specifications (TS 36.331).

In a case where the mode switching confirmation signal is not received (NO in step S13), the processing flow returns to step S12, in which the transmission unit $12a5$ retransmits the mode switching control signal. In a case where the mode switching confirmation signal is received (YES in step S13), a process in step S14 is executed.
(Step S14 in FIG. 6)

After the mode switching confirmation signal is received, to establish an initial connection in the relay station apparatus mode to the wireless station apparatuses $11a$ to $11d$, the mode switching control unit $12a2_1$ transmits to the wireless station apparatuses $11a$ to $11d$ configuration information associated with the relay station mode including subframe configuration information associated with MBSFN (Multicast/Broadcast Single Frequency Network) thereby setting the wireless station apparatuses $11a$ to $11d$ in the relay station apparatus mode. Details of the initial connection in the relay station apparatus mode will be described later.

In the above process, the mode switching control signal is in the form obtained by adding the mode switching control signal, for example, a RN-Mode and RN-Indication message to the RRC connection reconfiguration message, and the mode switching confirmation signal is in the form of the RRC connection reconfiguration complete message. Alternatively, other RRC messages, or control signaling in other layers may be used.

In the above description, it is assumed by way of example that the relay station apparatus establishment request signal from the MME/S-GW unit $13$ is in a unique signal format. Alternatively, the relay station apparatus establishment request signal may be included in another signal of the S1 interface or in a call signal (paging signal) to the wireless station apparatuses $11a$ to $11d$.

(Procedure of Mode Switching Process in Wireless Station Apparatus)

Figure 7:
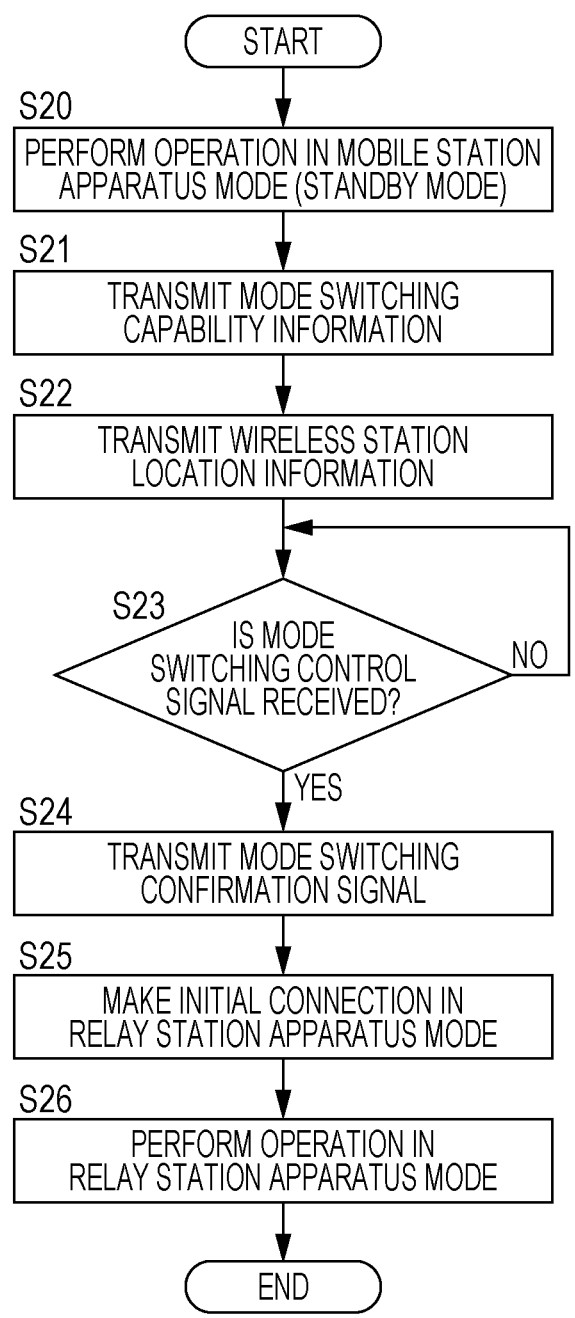
FIG. 7 is a flow chart illustrating an example of a processing procedure of a mode switching process in a wireless station apparatus.

Next, a procedure of a mode switching process in the wireless station apparatus $11a$ is explained. FIG. 7 is a flow chart illustrating an example of a procedure of a mode switching process in the wireless station apparatus $11a$.

As illustrated in FIG. 4, the higher layer processing unit $11a8$ of the wireless station apparatus $11a$ includes the mode switching processing unit $11a8_1$. This mode switching processing unit $11a8_1$ is realized by executing a computer program by hardware such as an integrated circuit and/or a processor.
(Step S20 in FIG. 7)

The mode switching processing unit $11a8_1$ of the higher layer processing unit $11a8$ of the wireless station apparatus $11a$ performs, after electric power is initially turned on, an initial connection procedure in the mobile station apparatus mode including a cell search procedure, a random access procedure normally performed by a mobile station apparatus, an UE attach procedure, and the like, thereby switching the mode of the wireless station apparatus $11a$ to the mobile station mode (so as to operate as a normal mobile station apparatus) and to the standby mode.
(Step S21 in FIG. 7)

The mode switching processing unit $11a8_1$ transmits a mode switching capability signal including mode switching capability information indicating that it is possible to switch between the mobile station apparatus mode and the relay station apparatus mode to the base station apparatus $12a$ and the MME/S-GW unit $13$ by using a mobile station apparatus capability transfer procedure (UE capability transfer) defined in the LTE specifications (TS 36.331).

As the format of the mode switching capability signal, the mode switching processing unit $11a8_1$ uses a format obtained by adding the mode switching capability information to a mobile station apparatus capability (UE capability information or UE EUTRA capability information) message which is one of RRC messages defined in the LTE specifications (TS 36.331).

The mode switching capability information includes one bit (or a plurality of coded bits) indicating whether or not it is capable of switching the mode or a plurality of information bits associated with mode switching capability parameters.

For example, a mode switching capability signal is added in the form of, for example, RN-Capability message, to a mobile station apparatus capability (UE EUTRA Capability Information) message described in an abstract syntax notation (ASN) as illustrated in a following example.

```
-- ASN1START
UE-EUTRA-Capability ::= SEQUENCE
......
RN-Capalibity ENUMERATED { supported }, -- mode switching is
capable}
-- ASN1STOP
```

The mobile station apparatus capability message with the added mode switching capability information is converted into an information bit sequence via an ASN encoder process executed by the higher layer processing unit $11a8$, and is input as a mode switching capability signal to the PUSCH generation unit $11a9_3$.

The mode switching capability signal input to the PUSCH generation unit $11a9_3$ is subjected to a scrambling processing, a modulation processing, a layer mapping processing, and a precoding processing. A resultant signal is mapped by the multiplexing unit $11a10$ to a downlink physical channel PUSCH corresponding to a resource element RE or a resource block RB at each particular position, and transmitted to the base station apparatus $12a$ and the MME/S-GW unit $13$ via the transmission unit $11a4_1$. The base station apparatus $12a$ and/or the MME/S-GW unit $13$ registers and manages the mobile station apparatus capability information in the mobile station apparatus database provided therein.
(Step S22 in FIG. 7)

The mode switching processing unit $11a8_1$ then transmits fixed location information of the wireless station apparatus $11a$ (in a case where the location of the wireless station apparatus $11a$ is fixed) or moving location information of the wireless station apparatus $11a$ (in a case where the wireless station apparatus $11a$ includes GPS or in a case where the wireless station apparatus $11a$ in which another built-in location measuring apparatus is disposed and a location measuring method is implemented) to the base station apparatus $12a$ and the MME/S-GW unit $13$ using a RRC message, a NAS (Non Access Stratum) message, or application data.

In a case where transmission of location information is temporarily or periodically requested or transmission of position information is requested by the base station apparatus $12a$ or the MME/S-GW unit $13$, then the mode switching processing unit $11a8_1$ transmits the location information according to a location position information transmission procedure defined in advance. The base station apparatus $12a$ and/or the MME/S-GW unit $13$ then registers the location information of the wireless station apparatus $11a$ in the mobile station apparatus database provided therein.
(Step S23 in FIG. 7)

Thereafter, the mode switching processing unit $11a8_1$ extracts a RRC connection reconfiguration message from the signal of the downlink physical channel PDSCH transmitted from the base station apparatus $12a$, and extracts one bit (or a plurality of coded bits) indicating that the mode is to be switched on or off and/or a bit sequence indicating a relay station number RN ID (RN Indication) from the mode switching control signal, for example, RN-Mode and RN-Indication messages, and the mode switching processing unit $11a8_1$ determines based thereon whether a mode switching control signal has been received from the base station apparatus $12a$.

For example, the wireless station apparatus (FDD mode) $11a$ illustrated in FIG. 4 receives the downlink physical channel signal via the transmitting/receiving antenna unit $11a1_2$ of the backhaul link (in the FDD mode, and with the transmission band center frequency f1 and the reception band center frequency f2), the receiving unit $11a3_2$, and the demultiplexing unit $11a6$. The wireless station apparatus (FDD mode) $11a$ extracts therefrom baseband data of the physical channel PDSCH and outputs the baseband data to the PDSCH extraction unit $11a7_9$.

The PDSCH extraction unit $11a7_9$ extracts control data corresponding to a resource element RB at each particular position from the PDSCH baseband data according to a predetermined rule by performing a demodulation processing, a decoding processing, a descrambling processing, and the like, and the PDSCH extraction unit $11a7_9$ outputs the extracted control data to the higher layer processing unit $11a8$.

The higher layer processing unit $11a8$ executes an ASN decoder process to decode a RRC connection reconfiguration message from the control data and extract an information bit sequence. The higher layer processing unit $11a8$ outputs the information bit sequence to the mode switching processing unit $11a8_1$ disposed in the higher layer processing unit $11a8$.

The mode switching processing unit $11a8_1$ extracts one bit (or a plurality of coded bits) indicating that the mode is to be switched on or off and/or a bit sequence of a relay station number RN ID from, for example, a RN-Mode and RN-Indication message serving as the mode switching control signal, and the mode switching processing unit $11a8_1$ determines based therefrom whether or not a mode switching control signal is given.

In a case where the mode switching control signal has not been received (NO in step S23), the processing flow returns to step S23, in which the mode switching processing unit $11a8_1$ again determines whether the mode switching control signal has been received from the base station apparatus $12a$. In a case where the mode switching control signal is received (YES in step S23), a process in step S24 is executed.
(Step S24 in FIG. 7)

After the mode switching processing unit $11a8_1$ receives the RRC connection reconfiguration message including the mode switching control signal, the mode switching processing unit $11a8_1$ transmits a RRC connection reconfiguration complete message defined in the LTE specifications (TS 36.331) as the mode switching confirmation signal to the base station apparatus $12a$.
(Step S25 in FIG. 7)

Using the relay station number RN ID extracted from the mode switching control signal or a relay station number RN ID registered in advance, the mode switching processing unit $11a8_1$ makes an initial connection in the relay station mode with the base station apparatus $12a$ according to an initial connection procedure in the relay station mode defined in the LTE specifications (TS 36.300, TS 23.401, TS 36.331) including a relay station apparatus attach procedure (RN Attach Procedure), a relay station apparatuses startup procedure (RN Startup Procedure), a RRC connection establishment procedure, and the like.
(Step S26 in FIG. 7)

Thereafter, the control unit $11a5$ receives configuration information in the relay station mode from the base station apparatus $12a$ via the initial connection procedure in the relay station mode, and the control unit $11a5$ reconfigures hardware and software of the wireless station apparatus $11a$ using the configuration information associated with the relay station mode such as MBSFN subframe configuration information included in the physical broadcast channel PBCH. The wireless station apparatus $11a$ then operates in the relay station mode such that a radio signal from a mobile station apparatus is relayed to the base station apparatus $12a$ and a radio signal from the base station apparatus $12a$ is relayed to the mobile station apparatus.

More specifically, the mode switching processing unit $11a8_1$ receives configuration information associated with the relay station mode and outputs a mode switching control signal to the control unit $11a5$ to instruct it to switch the mode from the mobile station apparatus mode to the relay station apparatus mode. The control unit $11a5$ operates blocks associated with the relay station apparatus mode.

For example, the control unit $11a5$ operates blocks illustrated in FIG. 4 including the receiving unit $11a3_1$, the ULRS extraction unit $11a7_1$, the PUCCH extraction unit $11a7_2$, the PDSCH extraction unit $11a7_3$, and the PRACH extraction unit $11a7_4$, and also the transmission unit $11a4_2$, DLRS generation unit $11a9_5$, the SS generation unit $11a9_6$, the PBCH generation unit $11a9_7$, the PDSCH generation unit $11a9_8$, the PDSCH generation unit $11a9_9$, the PCFICH generation unit $11a9_{10}$, and the PHICH generation unit $11a9_{11}$.

Based on the MBSFN subframe configuration information received from the base station apparatus 12a, the control unit 11a5 controls the operation timing and the like of the receiving units $11a3_1$ and $11a3_2$, the transmission units $11a4_1$ and $11a4_2$, the demultiplexing unit 11a6, the multiplexing unit 11a10, each of the physical channel extraction units $11a7_1$ to $11a7_{12}$, and each of the physical channel generation units $11a9_1$ to $11a9_{11}$.

Figure 8:
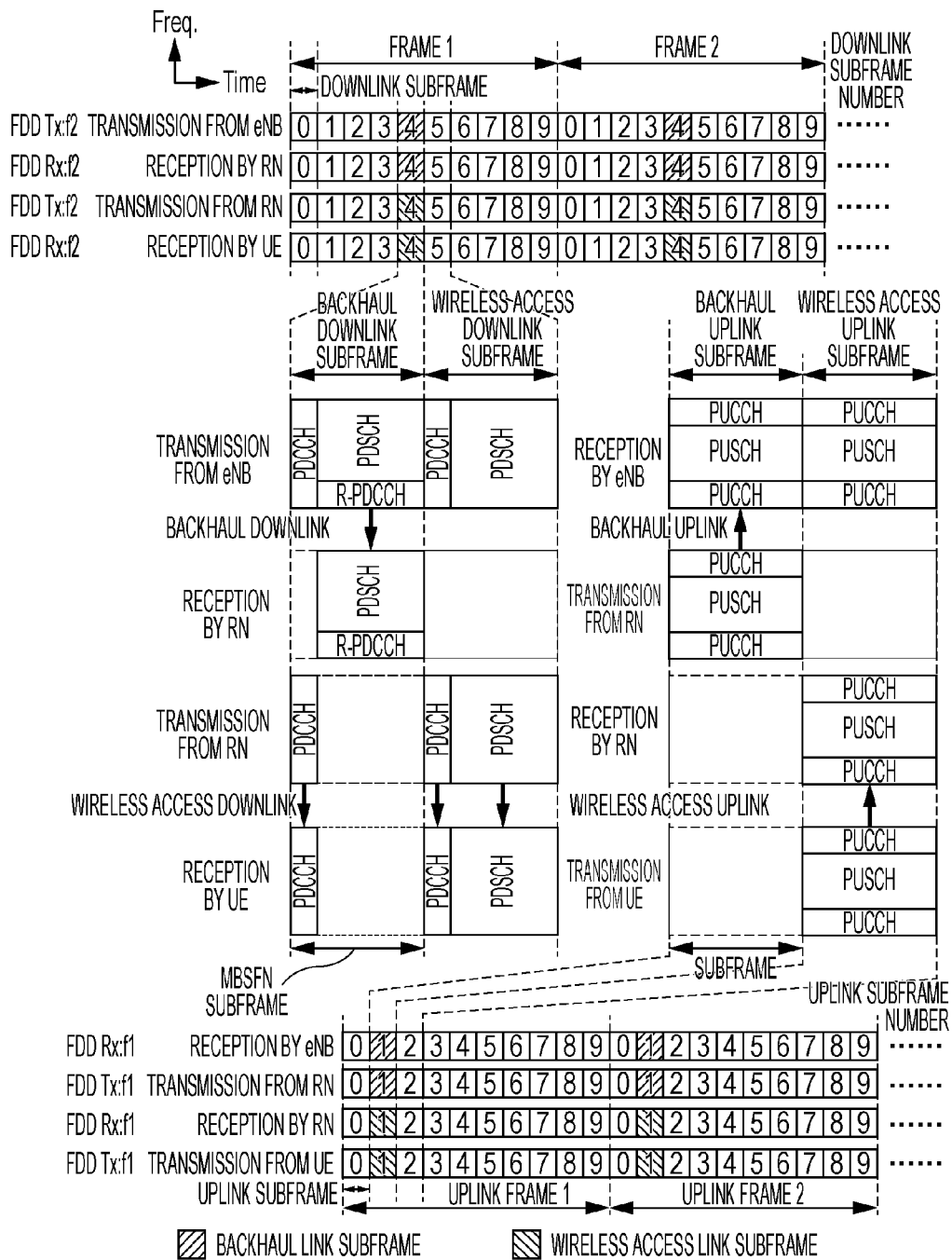
FIG. 8 is a diagram illustrating an example of a radio frame format for an uplink and a downlink in a relay system in an FDD mode.

FIG. 8 is a diagram illustrating an example of a radio frame format for the uplink and downlink in the relay system in the FDD mode. The base station apparatus 12a transmits the mode switching control signal to the wireless station apparatus 11a using the physical downlink shared channel PDSCH illustrated in FIG. 8. The wireless station apparatus 11a transmits the mode switching capability signal to the base station apparatus 12a using the physical uplink shared channel PUSCH illustrated in FIG. 8.

Furthermore, as illustrated in FIG. 1, the base station apparatus 12a transmits MBSFN subframe configuration information via the physical broadcast channel PBCH. For example, as illustrated in FIG. 8, the base station apparatus 12a assigns an MBSFN subframe to a downlink subframe number 4 and sends assignment information to the mobile station apparatus 10c and the wireless station apparatus 11a.

According to the received allocation information of the MBSFN subframe, the mobile station apparatus 10c ignores (does not receive) MBSFN subframes. The wireless station apparatus 11a receives relay data from the base station apparatus 12a using the MBSFN subframe. The wireless station apparatus 11a ignores (does not receive) subframes other than the MBSFN subframe.

The configuration of the relay system frame and the like illustrated in FIG. 8 and the operation of the wireless station apparatus 11a in the relay station mode are respectively similar to the relay system frame configuration and the operation of the relay station apparatus RN defined in the LTE specifications, and thus a further detailed description thereof is omitted. Furthermore, the relay station mode operation of the TDD-mode wireless station apparatus 11a illustrated in FIG. 5 is also similar to the operation of the relay station apparatus RN defined in the LTE specifications, and thus a further detailed description thereof is omitted.

In the above-described example, as for the format of the mode switching control signal, the format obtained by adding the mode switching control signal to the RRC connection reconfiguration message is used, and, as for the format of the mode switching confirmation signal, RRC connection reconfiguration complete message is used. However, instead, other RRC messages or control signaling of other layers may be used.

In the above description, the operation of the wireless station apparatus 11a in the FDD mode illustrated in FIG. 4 is explained. The wireless station apparatus 11a in the TDD mode illustrated in FIG. 5 operates in a manner corresponding to the operation of the base station apparatus 12a in the TDD mode, and thus a further detailed description thereof is omitted.

(Processing Procedure of Relaying Process of Relay System)

Figure 9:
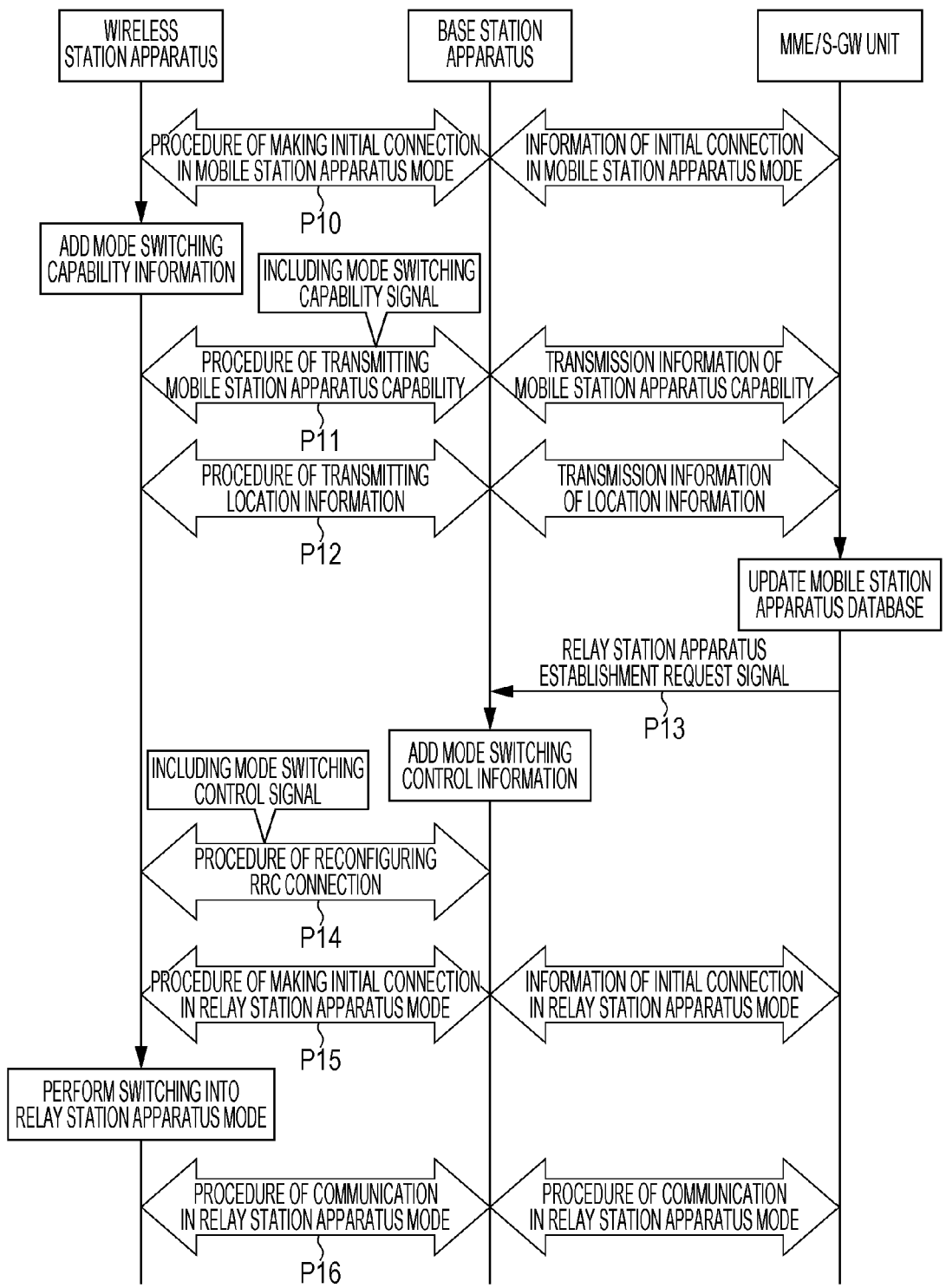
FIG. 9 is a sequence diagram illustrating an example of a processing procedure of a relaying process of a relay system according to the first embodiment of the present invention.

Next, a processing procedure of a relaying process of a relay system according to the first embodiment of the present invention is described below. FIG. 9 is a sequence diagram illustrating an example of a processing procedure of the relaying process of the relay system according to the first embodiment of the present invention. Referring to FIG. 6 and FIG. 7, an example of a relay area configuration process is described below.

(Procedure P10 in FIG. 9)

After the electric power of the wireless station apparatus 11a is turned on, the control unit 11a5 of the wireless station apparatus 11a reconfigures the hardware and/or software of the wireless station apparatus 11a such that the wireless station apparatus 11a operates in the mobile station apparatus mode.

The wireless station apparatus 11a then makes an initial connection in the mobile station apparatus mode with the base station apparatus 12a according to an initial connection procedure in the mobile station apparatus mode including an UE attach procedure, an UE startup procedure, a RRC connection establishment procedure, and the like.

The base station apparatus 12a and the MME/S-GW unit 13 treats the wireless station apparatus 11a as a normal mobile station apparatus and performs various processes according to the initial connection procedure. After the initial connection procedure in the mobile station apparatus mode is completed, it becomes possible for the wireless station apparatus 11a to make an outgoing call and receive an incoming call, and it also becomes possible for the wireless station apparatus 11a to go into a standby mode or a wireless connection mode.

(Procedure P11 in FIG. 9)

As described above in step S21 in FIG. 7, the wireless station apparatus 11a adds mode switching capability information to the mobile station apparatus capability (UE Capability Information or UE EUTRA Capability Information) message.

The mobile station apparatus capability message including the mode switching capability information is converted into an information bit sequence via an ASN encoder process executed by the higher layer processing unit 11a8, and is transmitted to the base station apparatus 12a and/or the MME/S-GW unit 13 by using a mobile station apparatus capability transmission procedure (UE capability transfer).

After the mobile station apparatus capability transmission procedure is completed, the mobile station apparatus capability information including the mode switching capability information is registered in the mobile station apparatus database of the base station apparatus 12a and/or the MME/S-GW unit 13.

(Procedure P12 in FIG. 9)

As described above in step S22 in FIG. 7, the wireless station apparatus 11a transmits location information of the wireless station apparatus 11a. The wireless station apparatus 11a transmits fixed location information of the wireless station apparatus 11a (in a case where the location of the wireless station apparatus 11a is fixed) or moving location information of the wireless station apparatus 11a (in a case where the wireless station apparatus 11a includes GPS or the wireless station apparatus 11a in which another built-in location measurement apparatus is disposed and a location measurement method is implemented) to the base station apparatus 12a and/or the MME/S-GW unit 13 using a RRC message, a NAS (Non Access Stratum) message, or application data.

In a case where transmission of location information is temporarily or periodically requested or transmission of position information is requested by the base station apparatus 12a or the MME/S-GW unit 13, then the wireless station apparatus 11a transmits the location information according to a position information transmission procedure defined in advance. The base station apparatus 12a and/or the MME/S-GW unit 13 updates the mobile station apparatus database by registering the location information of the wireless station apparatus 11a in the mobile station apparatus database provided therein. The mobile station apparatus database may be configured, for example, as illustrated in Table 1.

TABLE 1

| No. | Mobile station apparatus number | Wireless connection status | Mode switching capability | Location information (latitude, longitude) |
|---|---|---|---|---|
| 1 | 101 | 0 (standby mode) | 1 (YES) | Area number 1: Tokyo area (35.6582, 139.7456) |
| 2 | 150 | 1 (wireless connection mode) | 1 (YES) | Base station apparatus number: CGI = 2 (135.8256, 39.5674) |
| 3 | 151 | 0 (standby mode) | 1 (YES) | Area number 1: Tokyo area |
| 4 | 160 | 1 (wireless connection mode) | 1 (YES) | Base station apparatus number: CGI = 9 |
| 5 | 200 | 0 (standby mode) | 0 (NO) | Area number 2: Osaka area |
| 6 | 201 | 1 (wireless connection mode) | 0 (NO) | Base station apparatus number: CGI = 5 |
| . | . | . | . | . |
| . | . | . | . | . |
| . | . | . | . | . |

Base Station Apparatus Number CGI: Cell Global Identity

In Table 1, mobile station apparatuses having a mode switching capability are wireless station apparatuses.
(Procedure P13 in FIG. 9)

As described in step S10 in FIG. 6, the MME/S-GW unit 13 makes a determination, based on various kinds of information, as the location of a communication capability sustained area, a service expanded area, a radio-wave environment improved area, or an interference reduced area, and then, based on information registered in advance and managed by the mobile station apparatus database such as mobile station apparatus numbers, wireless connection status, mode switching capability information of wireless station apparatuses, and location information of wireless station apparatuses, the MME/S-GW unit 13 selects the wireless station apparatus 11a that is capable of operating in the relay station apparatus mode and that is at a location suitable for establishing a communication capability sustained area. The MME/S-GW unit 13 then transmits a relay station apparatus establishment request signal to the base station apparatus 12a.

For example, based on the mode switching capability and the location information in Table 1, the MME/S-GW unit 13 selects a wireless station apparatus 11a with a mobile station apparatus number 101. The wireless station apparatus 11a is in the standby mode (RRC IDLE Mode), and thus the MME/S-GW unit 13 performs a call process to the wireless station apparatus 11a and changes the wireless station apparatus 11a into the wireless connection mode. The MME/S-GW unit 13 then transmits a relay station apparatus establishment request signal to the base station apparatus 12a that controls the communication of the wireless station apparatus 11a.
(Procedure P14 in FIG. 9)

Thereafter, as described above in step S2 in FIG. 6, the base station apparatus 12a adds the mode switching control signal to the RRC connection reconfiguration message. The RRC connection reconfiguration message including the mode switching control signal is subjected to the ASN encoding process executed by the higher layer processing unit 12a2. As a result, an information bit sequence is generated and the resultant information bit sequence is transmitted to the wireless station apparatus 11a via the RRC connection reconfiguration procedure.

In a case where the wireless station apparatus 11a correctly receives the RRC connection reconfiguration message, then, as described above in step S24 in FIG. 7, the wireless station apparatus 11a transmits the RRC connection reconfiguration complete message including the mode switching control signal to the base station apparatus 12a.
(Procedure P15 in FIG. 9)

As described above in step S25 in FIG. 7, using the relay station number RN ID extracted from the mode switching control signal or the relay station number RN ID registered in advance, the wireless station apparatus 11a makes an initial connection in the relay station mode with the base station apparatus 12a and the MME/S-GW unit 13 according to the initial connection procedure in the relay station mode including a relay station apparatus attach procedure (RN Attach Procedure), a relay station apparatuses tartup procedure (RN Startup Procedure), a RRC connection establishment procedure, and the like.
(Procedure P16 in FIG. 9)

As described above in step S26 in FIG. 7, the wireless station apparatus 11a receives configuration information associated with the relay station mode from the base station apparatus 12a and reconfigures hardware and/or software of the wireless station apparatus 11a using the configuration information associated with the relay station mode, such as the MBSFN subframe configuration information and the like.

The wireless station apparatus 11a then operates in the relay station mode such that radio signals from the mobile station apparatuses 10a, 10b, and 10d illustrated as examples in FIG. 1 are relayed to the base station apparatus 12a, and a radio signal from the base station apparatus 12a is relayed to the base station apparatus 12a and a radio signal from the base station apparatus 12a is relayed to the mobile station apparatuses 10a, 10b, and 10d.

Advantageous Effects of the First Embodiment of the Present Invention

The base station apparatus 12a and the wireless station apparatuses 11a to 11d according to the first embodiment of the present invention are capable of adding a relay area depending on various situations such as those illustrated in FIG. 2. For example, adding a communication capability sustained area makes it possible to continue communication using the base station apparatus 12a instead of a base station apparatus that has lost the communication capability.

By adding a service expanded area, it is possible to extend a service area of an existing base station apparatus to satisfy demands from users and demands from society. By adding an interference reduced area, it is possible to reduce interference with an adjacent base station apparatus thereby increasing the system communication capacity. It is also possible to reduce the transmission power of the mobile station apparatus 10c thereby suppressing the battery consumption. By adding a radio-wave environment improved area, it is possible to suppress instability of radio waves for wireless communication.

The base station apparatus 12a transmits a mode switching control signal to the wireless station apparatuses 11a to 11d, and the wireless station apparatuses 11a to 11d receives the mode switching control signal transmitted from the base station apparatus 12a. This makes it possible to effectively switch the wireless station apparatuses 11a to 11d to the relay station apparatus mode.

The wireless station apparatuses 11a to 11d transmit, to the base station apparatus 12a, mode switching capability information indicating that it is possible to switch the mode between the mobile station apparatus mode and the relay station apparatus mode, and the base station apparatus 12a selects wireless station apparatuses 11a to 11d having a mode switching capability based on the mode switching capability information and transmits a mode switching control signal to the selected wireless station apparatuses 11a to 11d. This makes it possible to properly transmit a mode switching instruction to the apparatus having the mode switching capability of the wireless station apparatuses 11a to 11d.

The wireless station apparatuses 11a to 11d transmit location information indicating the locations of the wireless station apparatuses 11a to 11d to the base station apparatus 12a, and the base station apparatus 12a selects wireless station apparatuses 11a to 11d based on the location information and transmits a mode switching control signal to the selected apparatus of the wireless station apparatuses 11a to 11d. This makes it possible to properly set a location via which radio wave for wireless communication is relayed.

The base station apparatus 12a determines an area in which communication is allowed between the mobile station apparatuses 10a to 10d and the base station apparatus 12a, and selects the wireless station apparatuses 11a to 11d that relay communication between the base station apparatus 12a and the mobile station apparatuses 10a to 10d located in the area. The base station apparatus 12a transmits a mode switching control signal to the selected wireless station apparatuses 11a to 11d. This makes it possible to properly set the wireless station apparatuses 11a to 11d that relays a radio wave for wireless communication.

Figure 10:
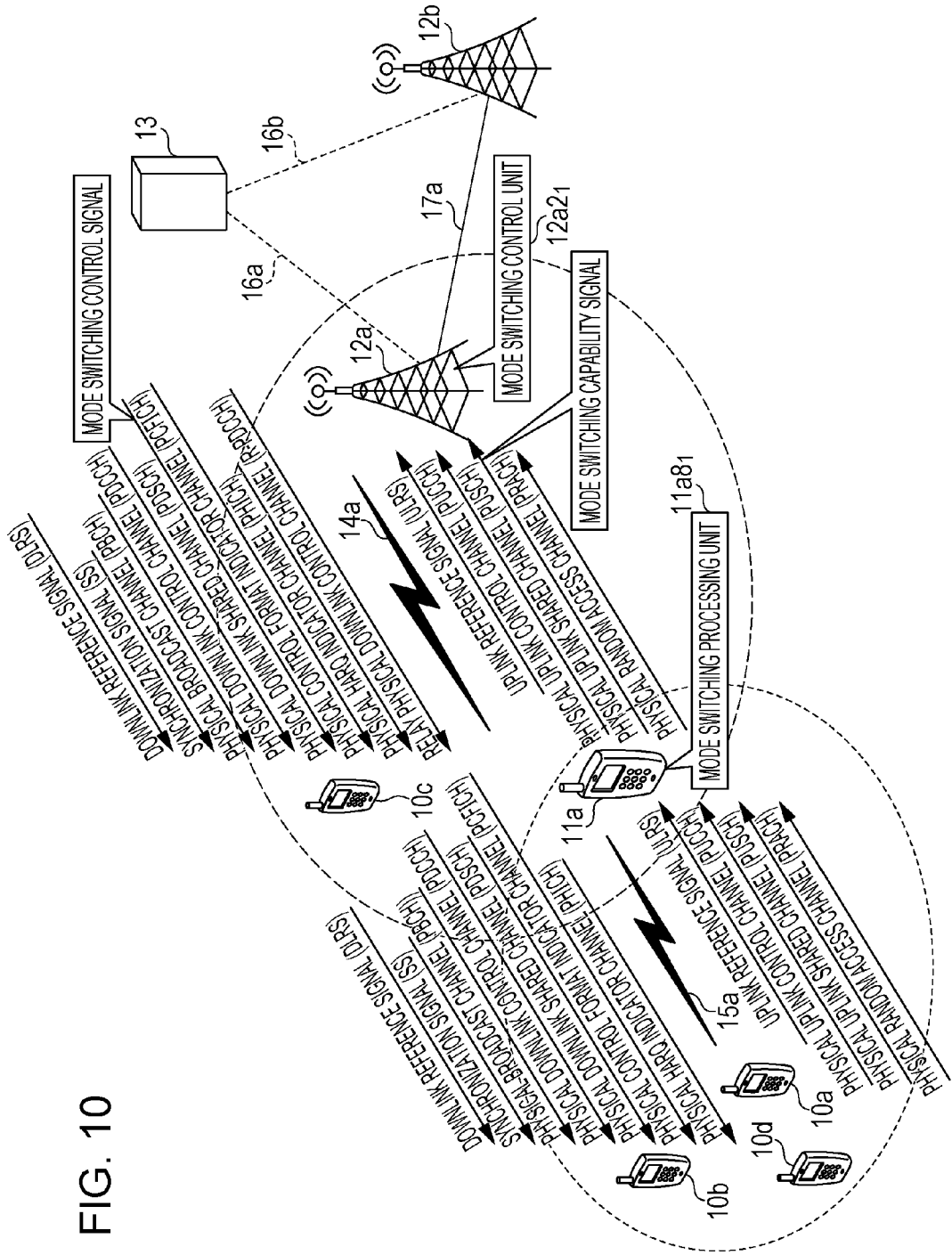
FIG. 10 is a conceptual diagram illustrating an example of a configuration of a wireless relay communication system according to a second embodiment of the present invention.

The base station apparatus 12a and/or the MME/S-GW unit 13 has the mobile station apparatus database in which mode switching capability information and location information of mobile station apparatuses are registered and managed. This makes it possible to select a wireless station apparatus depending on various situations such as those illustrated in FIG. 2 thereby properly adding a relay area.
(Second Embodiment)
Configuration of Wireless Relay Communication System FIG. 10 is a conceptual diagram illustrating an example of a configuration of a wireless relay communication system according to a second embodiment of the present invention. This wireless relay communication system includes mobile station apparatuses 10a to 10d, a wireless station apparatus 11a, base station apparatuses 12a and 12b, and a mobility management entity/serving gateway (MME/S-GW) unit 13 serving as a network control unit of the wireless communication system.

In the second embodiment, as described below, a relay station apparatus establishment request signal from the MME/S-GW unit 13 is not necessary, but the base station apparatus 12a judges a situation and transmits a mode switching control signal to the wireless station apparatus 11a.

In the second embodiment of the present invention, the configurations of the base station apparatuses 12a and 12b, the configuration of the wireless station apparatuses 11a to 11d (in the FDD/TDD mode), and the configuration of the wireless relay communication system including above apparatuses are similar to those illustrated in FIG. 2, FIG. 3, and FIG. 4, and thus a further description of the configurations of the base station apparatus 12a and the wireless station apparatus 11a is omitted.
(Processing Procedure of Mode Switching Process in Base Station Apparatus)

Figure 11:
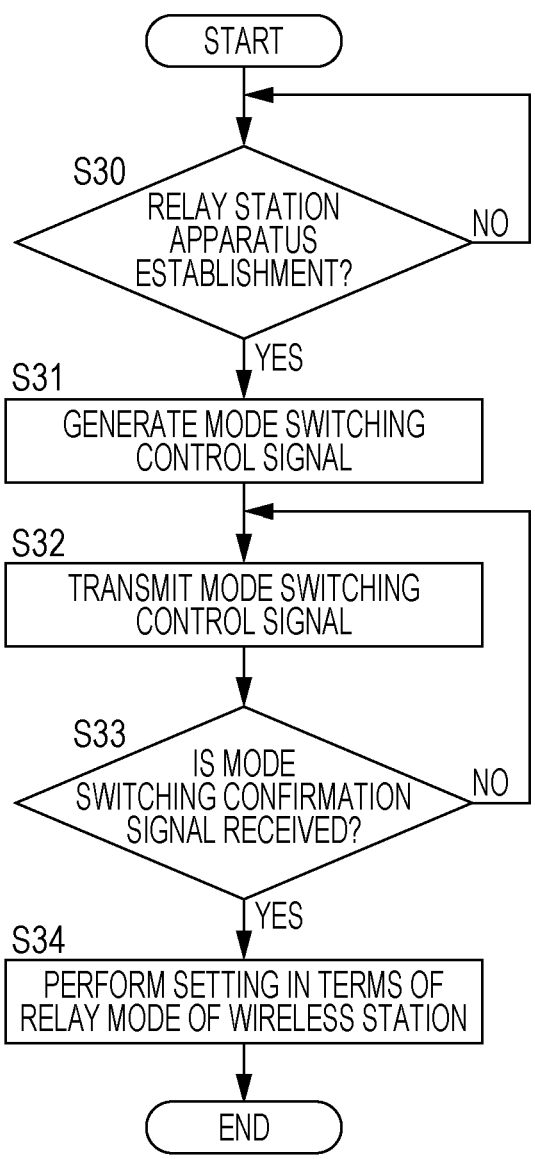
FIG. 11 is a flow chart illustrating an example of a processing procedure of a mode switching process in a base station apparatus.

FIG. 11 is a flow chart illustrating an example of a processing procedure of a mode switching process in the base station apparatus 12a. As illustrated in FIG. 3, the higher layer processing unit 12a2 of the base station apparatus 12a includes a mode switching control unit $12a2_1$ that controls switching a mode between a mobile station apparatus mode and a relay station apparatus mode.

The mode switching control unit $12a2_1$ is realized by executing a computer program by hardware such as an integrated circuit and/or a processor. FIG. 10 illustrates an example of a wireless relay system according to the second embodiment.
(Step S30 in FIG. 11)

First, the mode switching control unit $12a2_1$ of the higher layer processing unit 12a2 of the base station apparatus 12a receives various kinds of information from the nearby base station apparatuses (for example, the base station apparatus 12b) or the MME/S-GW unit 13 and determines whether there is a relay station apparatus establishment request signal.

More specifically, to establish a communication capability sustained area, a service expanded area, a radio-wave environment improved area, or an interference reduced area in the base station apparatus 12a, the interface unit 12a1 receives various kinds of information from the MME/S-GW unit 13 or the base station apparatus 12b via an interface (S1) 16a between the base station apparatus 12a and the MME/S-GW unit 13 or via an interface (X1) 17a between the base station apparatus 12a and the base station apparatus 12b as illustrated in FIG. 10.

In a case where the mode switching control unit $12a2_1$ receives earthquake/tsunami occurrence information or failure information of the base station apparatus 12c from, for example, the base station apparatus 12b or the MME/S-GW unit 13, the mode switching control unit $12a2_1$ determines that it is necessary to establish a relay station apparatus to provide a communication capability sustained area.

In a case where the mode switching control unit $12a2_1$ receives information of a change in a weather condition, information of an incident/accident, a request for police/fire/rescue dispatch, or the like, for example, from the base station apparatus 12b or the MME/S-GW unit 13, the mode switching control unit $12a2_1$ determines that it is necessary to establish a relay station apparatus to provide a service expanded area.

In a case where the mode switching control unit $12a2_1$ receives information of an interference report associated with the base station apparatus 12b or the like from the base station apparatus 12b or the MME/S-GW unit 13, the mode switching control unit $12a2_1$ determines that it is necessary to establish a relay station apparatus to provide an interference reduced area.

The mode switching control unit $12a2_1$ receives a reconnection request, information of communication quality, or the like from a plurality of mobile station apparatuses located in a service area of the base station apparatus 12a. In a case where many reconnection requests occur or in case where degradation in communication quality is found, the mode switching control unit $12a2_1$ determines that it is necessary to establish a relay station apparatus to provide a radio-wave environment improved area.

In a case where it is not necessary to establish a relay station apparatus (NO in step S30), the processing flow returns to step S30, in which the mode switching control unit $12a2_1$ repeatedly receives information and determines whether or not it is necessary to establish a relay station apparatus. In a case where it is necessary to establish a relay station apparatus (YES in step S30), processing in step S31 is performed.

(Step S31 in FIG. 11)

In a case where it is necessary to establish a relay station apparatus (YES in step S30), the mode switching control unit $12a2_1$ accesses the mobile station apparatus database disposed in the base station apparatus $12a$ or the mobile station apparatus database of the MME/S-GW unit 13, and selects a wireless station apparatus located in a relay area to be established. The mode switching control unit $12a2_1$ generates a mode switching control signal that is to be transmitted to the selected wireless station apparatus.

For example, the mode switching control unit $12a2_1$ determines, from a unique physical cell number PCI or a base station apparatus number CGI (Cell Global Identity) of a failed base station apparatus $12c$, that it is necessary to establish a communication capability sustained area in a service area of the base station apparatus $12a$ adjacent to a service area of the base station apparatus $12c$, and the mode switching control unit $12a2_1$ selects, using the mobile station apparatus database, a wireless station apparatus $11a$ in the wireless connection mode located in the communication capability sustained area determined to be established. The mode switching control unit $12a2_1$ then generates a mode switching control signal to be transmitted to the selected wireless station apparatus $11a$.

Note that the mode switching control unit $12a2_1$ may make a call via the MME/S-GW unit 13 to a wireless station apparatus in the standby mode that is not under the control of the base station apparatus $12a$ thereby causing the wireless station apparatus to turn into the wireless connection mode. The mode switching control unit $12a2_1$ then may make a selection of wireless station apparatus.

The mode switching control signal is generated by a method similar to that described above in step S11 in FIG. 6, and thus a further detailed description thereof is omitted. Step S32 to step S34 are similar to step S12 to step S14 in FIG. 6, and thus a further detailed description thereof is omitted.

(Processing Procedure of Mode Switching Process in Wireless Station Apparatus)

A processing procedure of a mode switching process performed by the mode switching processing unit $11a8_1$ of the wireless station apparatus $11a$ according to the second embodiment of the present invention is similar to the processing procedure described above with reference to FIG. 7, and thus a further detailed description thereof is omitted.

(Processing Procedure of Relaying Process of a Wireless Relay Communication System)

Figure 12:
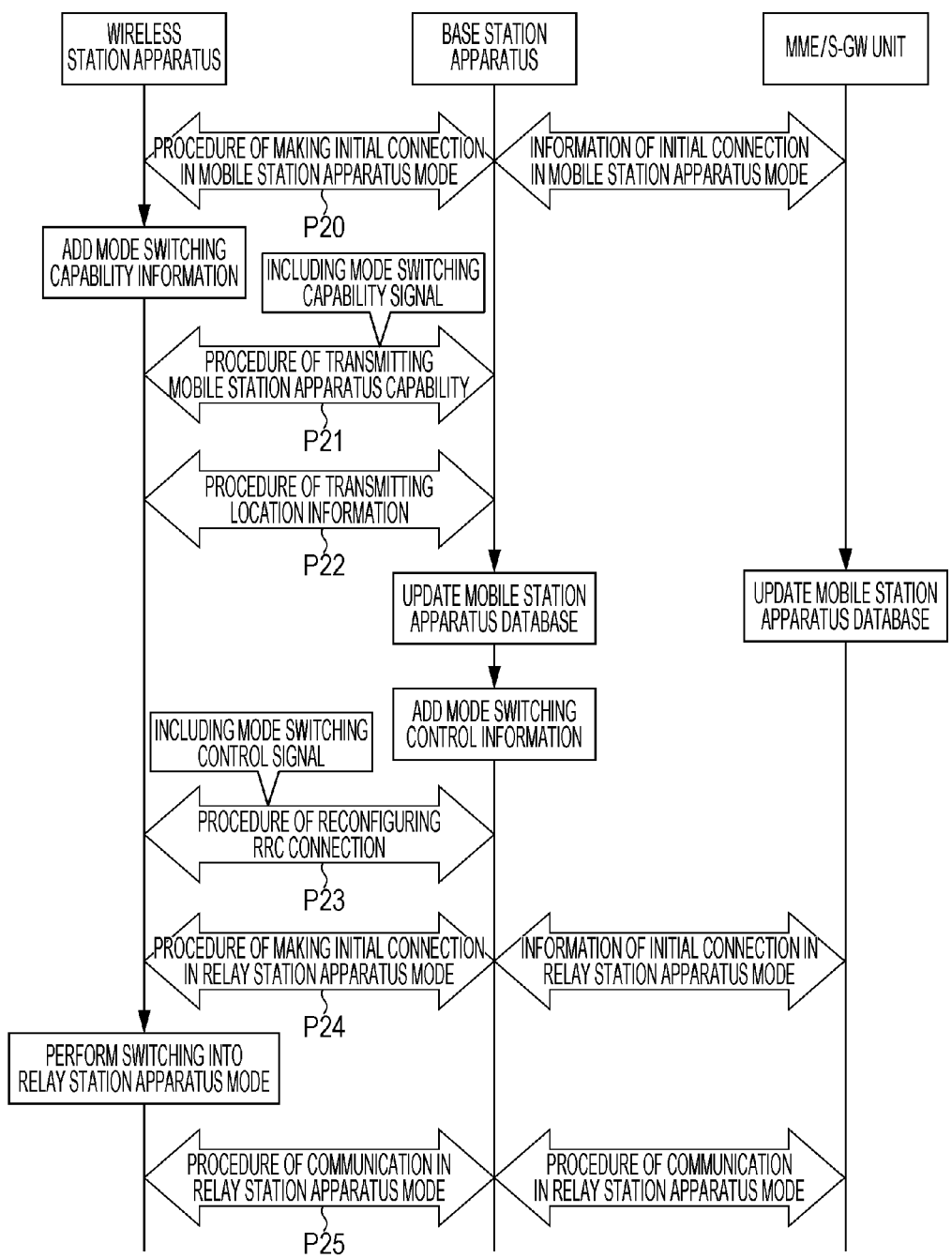
FIG. 12 is a sequence diagram illustrating an example of a processing procedure of a relaying process of a wireless relay communication system according to the second embodiment of the present invention.

Next, a processing procedure of a wireless relay communication system according to the second embodiment of the present invention is described below. FIG. 12 is a sequence diagram illustrating an example of a processing procedure of the relaying process of the wireless relay communication system according to the second embodiment of the present invention. Referring to FIG. 7 and FIG. 11, an example of a relay area configuration is described below.

(Procedure P20, Procedure P21, and Procedure P22 in FIG. 12)

A procedure P20, a procedure P21, and procedure P22 in FIG. 12 are similar to the procedure P10, the procedure P11, and the procedure P12 illustrated in FIG. 9, and thus a further detailed description thereof is omitted. Note that the base station apparatus $12a$ and the MME/S-GW unit 13 update and mange respective mobile station apparatus databases provided in the base station apparatus $12a$ and the MME/S-GW unit 13 depending on whether a wireless station apparatus is located in a service area covered by the base station apparatus $12a$ and the MME/S-GW unit 13.

(Procedure P23 in FIG. 12)

As described in step S30 in FIG. 11, the base station apparatus $12a$ receives various kinds of information from the nearby base station apparatuses (for example, the base station apparatus $12b$) or the MME/S-GW unit 13 and determines whether or not it is necessary to establish a relay station apparatus.

In a case where it is necessary to establish a relay station apparatus, then, as described above in step S31 in FIG. 11, the base station apparatus $12a$ accesses the mobile station apparatus database disposed in the base station apparatus $12a$ or the mobile station apparatus database disposed in the MME/S-GW unit 13, and selects a wireless station apparatus located in a relay area to be established. The base station apparatus $12a$ then generates a mode switching control signal that is to be transmitted to the selected wireless station apparatus.

For example, the base station apparatus $12a$ determines, from a unique physical cell number PCI or a base station apparatus number CGI (Cell Global Identity) of a failed base station apparatus $12c$, that it is necessary to establish a communication capability sustained area in a service area of the base station apparatus $12a$ adjacent to a service area of the base station apparatus $12c$, and the base station apparatus $12a$ selects, using the mobile station apparatus database, a wireless station apparatus $11a$ in the wireless connection mode located in the communication capability sustained area determined to be established.

Note that the base station apparatus $12a$ may make a call via the MME/S-GW unit 13 to a wireless station apparatus in the standby mode that is not under the control of the base station apparatus $12a$ thereby causing the wireless station apparatus to turn into the wireless connection mode. The base station apparatus $12a$ then may make a selection of wireless station apparatus. The base station apparatus $12a$ then generates a mode switching control signal to be transmitted to the selected wireless station apparatus $11a$.

Thereafter, the base station apparatus $12a$ adds the mode switching control signal to the RRC connection reconfiguration message. The RRC connection reconfiguration message including the mode switching control signal is subjected to the ASN encoding process executed by the higher layer processing unit $12a2$. As a result, an information bit sequence is generated and the resultant information bit sequence is transmitted to the wireless station apparatus $11a$ via the RRC connection reconfiguration procedure.

In a case where the wireless station apparatus $11a$ correctly receives the RRC connection reconfiguration message, then, as described above in step S24 in FIG. 7, the wireless station apparatus $11a$ transmits the RRC connection reconfiguration complete message as the mode switching confirmation signal to the base station apparatus $12a$.

(Procedure P24 and procedure P25 in FIG. 12)

A procedure P24 and a procedure P25 are similar to the procedure P15 and the procedure P16 illustrated in FIG. 9, and thus a further detailed description thereof is omitted.

(Advantageous Effects of the Second Embodiment of the present Invention)

The base station apparatus $12a$ and the wireless station apparatuses $11a$ to $11d$ according to the second embodiment of the present invention are capable of adding a relay area depending on various situations such as those illustrated in FIG. 2. For example, adding a communication capability sustained area makes it possible to continue communication using the base station apparatus $12a$ instead of a base station apparatus that has lost the communication capability.

By adding a service expanded area, it is possible to extend a service area of an existing base station apparatus to satisfy demands from users and demands from society. By adding an interference reduced area, it is possible to reduce interference with an adjacent base station apparatus thereby increasing the system communication capacity. It is also possible to reduce the transmission power of the mobile station apparatus $10c$ thereby suppressing the battery consumption. By adding a radio-wave environment improved area, it is possible to suppress instability of radio waves for wireless communication.

(Third Embodiment)

(Configuration of Wireless Relay Communication System)

Figure 13:
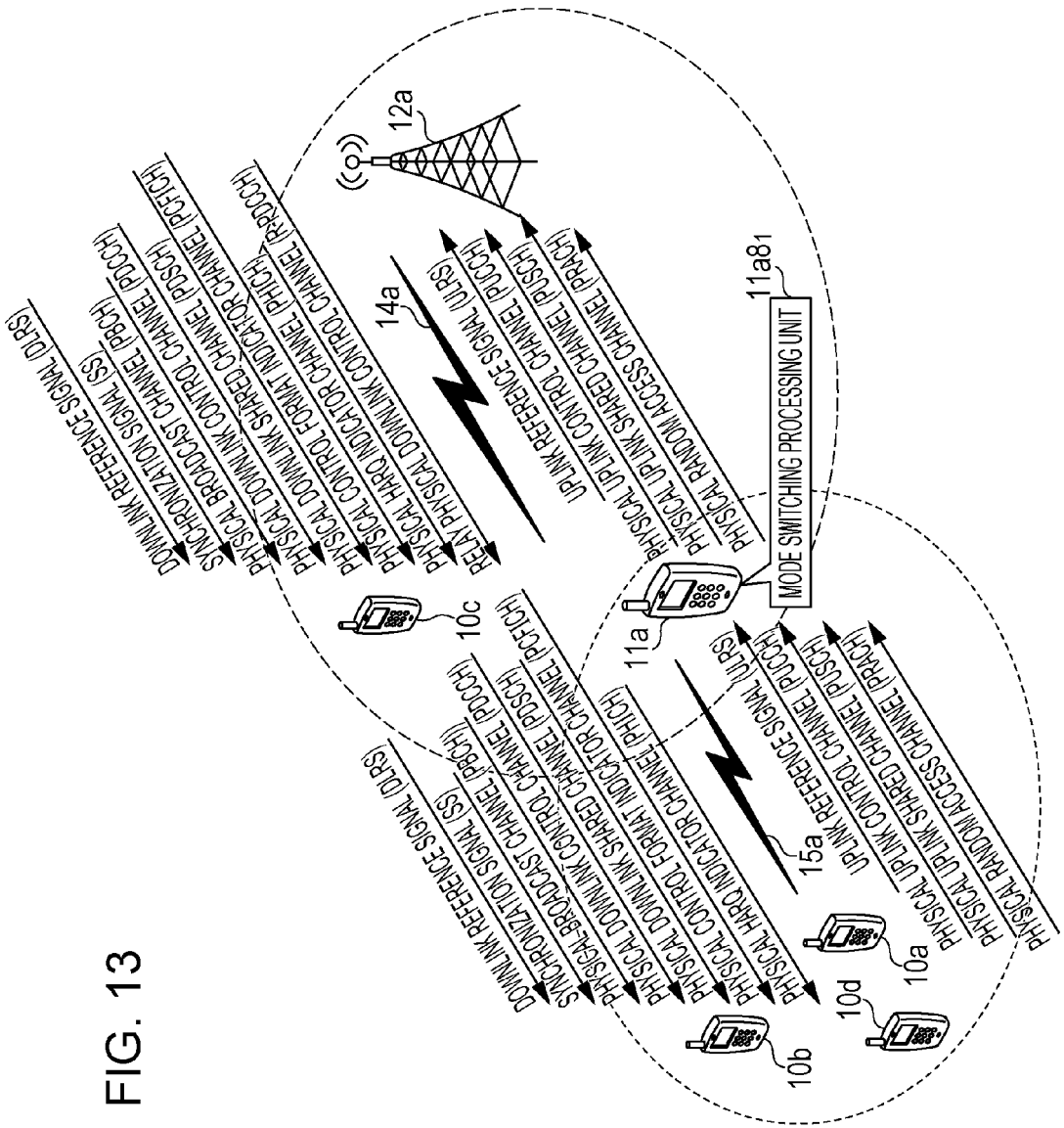
FIG. 13 is a conceptual diagram illustrating an example of a configuration of a wireless relay communication system according to a third embodiment of the present invention.

FIG. 13 is a conceptual diagram illustrating an example of a configuration of a wireless relay communication system according to a third embodiment of the present invention. This wireless relay communication system includes mobile station apparatuses $10a$ to $10d$, a wireless station apparatus $11a$, and a base station apparatus $12a$. In this wireless relay communication system, it is not necessary for the wireless station apparatus $11a$ illustrated in FIG. 1 to transmit the mode switching capability signal and it is not necessary for the base station apparatus $12a$ to transmit the mode switching control signal.

Configurations of the base station apparatus $12a$ and the wireless station apparatuses $11a$ to $11d$ (FDD/TDD mode) according to the third embodiment of the present invention and the configuration of a relay system including the above apparatuses are similar to those according to the first embodiment except that the base station apparatus $12a$ does not need the mode switching control unit $12a2_1$.

The wireless relay communication system according to the third embodiment also includes, as with the wireless relay communication system illustrated in FIG. 2, an MME/S-GW unit 13 in addition to the mobile station apparatuses $10a$ to $10d$, the wireless station apparatus $11a$, and the base station apparatus $12a$ illustrated in FIG. 13.

(Configuration of Base Station Apparatus)

The configuration of the base station apparatus $12a$ according to the third embodiment is similar to that illustrated as an example in FIG. 3 except that the mode switching control unit $12a2_1$ is removed, and thus a further description thereof is omitted here. This base station apparatus $12a$ is a base station apparatus based on the LTE specifications.

(Configuration of Wireless Station Apparatus)

Figure 14:
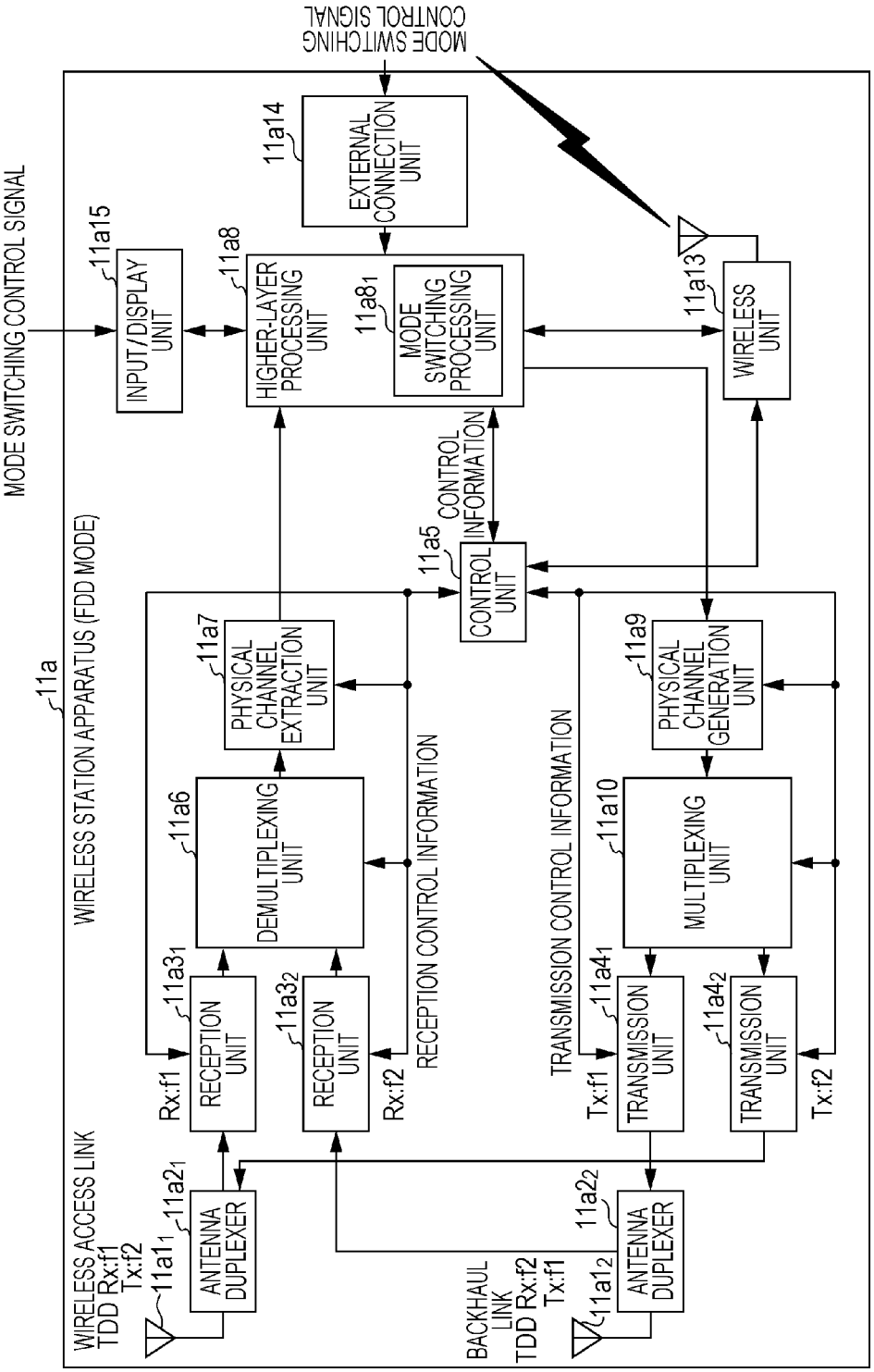
FIG. 14 is a diagram illustrating an example of a configuration of an FDD-mode wireless station apparatus according to the third embodiment of the present invention.

FIG. 14 is a conceptual diagram illustrating an example of a configuration of an FDD-mode wireless station apparatus $11a$ according to the third embodiment of the present invention. The configuration of this wireless station apparatus $11a$ is similar to that of the wireless station apparatus $11a$ illustrated as an example in FIG. 4 except for the wireless unit $11a13$, the external connection unit $11a14$, and the input/display unit $11a15$. However, the mode switching processing unit $11a8_1$ disposed in the higher layer processing unit $11a8$ operates differently.

A description of functional blocks similar to those illustrated in FIG. 4 is omitted, but a description is given below as to the wireless unit $11a13$, the external connection unit $11a14$, the input/display unit $11a15$, and the mode switching processing unit $11a8_1$.

The wireless unit $11a13$ is a wireless interface disposed in the wireless station apparatus $11a$. The wireless unit $11a13$ may include a wireless communication receiving apparatus configured to receive wireless communication such as a wireless LAN (Local Area Network), Bluetooth (registered trademark), amateur radio, a municipal emergency radio system, or the like, or a broadcast receiving apparatus configured to receive digital terrestrial broadcast or radio broadcast, an emergency early warning receiving apparatus configured to receive an emergency early warning signals, or the like.

In a case where the wireless unit $11a13$ is a wireless communication receiving apparatus configured to receive a wireless communication via a wireless LAN, the wireless unit $11a13$ is capable of wirelessly connecting to external apparatuses in an ad hoc mode or an infrastructure mode, and capable of receiving mode switching control signals in various formats from various external apparatuses.

The external connection unit $11a14$ is an interface conversion unit for making a wired connection to an external apparatus via a dedicated line, a telephone line, a LAN line or the like. The external connection unit $11a14$ is capable of receiving mode switching control signals in various formats from various external apparatuses.

The input/display unit $11a15$ is a user interface of the wireless station apparatus $11a$. An input given by a user via a key, a touch panel, or the like is processed by an application processor (not illustrated in figures) disposed in the wireless station apparatus $11a$ and is displayed to provide information to the user. The input/display unit $11a15$ is capable of receiving inputs of mode switching control signals in various formats.

The mode switching processing unit $11a8_1$ disposed in the higher layer processing unit $11a8$ receives a mode switching control signal from the wireless unit $11a13$, the external connection unit $11a14$, or the input/display unit $11a15$.

In the example illustrated in FIG. 13, in a case where the wireless station apparatus $11a$ receives a mode switching control signal when the wireless station apparatus $11a$ is in the mobile station apparatus mode, the mode of the wireless station apparatus $11a$ is switched to the relay station mode and the wireless station apparatus $11a$ performs processing to relay communication between the mobile station apparatus $10a$, $10b$, or $10d$ and the base station apparatus $12a$.

(Processing Procedure of Mode Switching Process in Wireless Station Apparatus)

Figure 15:
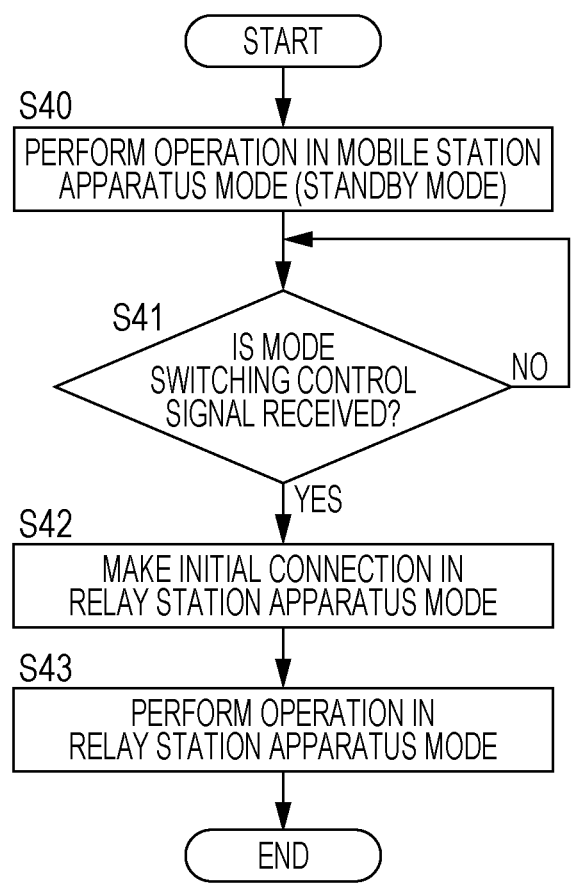
FIG. 15 is a flow chart illustrating an example of a processing procedure of a mode switching process in a wireless station apparatus.

Next, a procedure of a mode switching process in the wireless station apparatus $11a$ is explained. FIG. 15 is a flow chart illustrating an example of a procedure of a mode switching process in the wireless station apparatus $11a$.

The higher layer processing unit $11a8$ of the wireless station apparatus $11a$ includes a mode switching processing unit $11a8_1$ as illustrated in FIG. 14. This mode switching processing unit $11a8_1$ is realized by executing a computer program by hardware such as an integrated circuit and/or a processor.

(Step S40 in FIG. 15)

First, the mode switching processing unit $11a8_1$ provided in the higher layer processing unit $11a8$ of the wireless station apparatus $11a$ executes an initial connection procedure in the mobile station apparatus mode thereby switching the mode of the wireless station apparatus $11a$ to the mobile station mode (so as to operate as a normal mobile station apparatus) and to the standby mode. The process in step S40 is similar to the process in step S20 illustrated in FIG. 7, and thus a further detailed description thereof is omitted.

(Step S41 in FIG. 15)

The mode switching processing unit $11a8_1$ determines whether a mode switching control signal is received from the wireless unit $11a13$, the external connection unit $11a14$, or the input/display unit $11a15$. In a case where the mode switching control signal has not been received (NO in step S41), the processing flow returns to step S41, in which the mode switching processing unit $11a8_1$ repeats the determination as to whether the mode switching control signal is received. In a case where the mode switching control signal is received (YES in step S41), a process in step S42 is executed.

(Step S42 and step S43 in FIG. 15)

Step S42 and step S43 are respectively similar to step S25 and step S26 in FIG. 7, and thus a description thereof is omitted.

(Advantageous Effects of the Third Embodiment of the Present Invention)

In the third embodiment of the present invention, wireless station apparatuses 11a to 11c are disposed in advance according to a predetermined plan at disaster prevention facilities such as school, public halls, or the like taking into account locations of nearby base station apparatuses, service areas covered by relay station apparatuses, so as to make it possible for the base station apparatus 12a and the wireless station apparatuses 11a to 11c to establish an emergency relay system similar to that illustrated in FIG. 2 based on autonomous decision when a disaster occurs, in response to a broadcast signal, a disaster prevention radio signal, or the like using dedicated lines among disaster prevention facilities or in response to a manual input by a user or an administrator.

In a normal situation, the wireless station apparatuses 11a to 11c are capable of operating in the mobile station apparatus mode as communication means at facilities, while in case of emergency, the wireless station apparatuses 11a to 11c are capable of operating in the relay station apparatus mode. Besides, it is not necessary to change the base station apparatus or add a function, but the base station apparatus may be an apparatus according to the LTE specifications, which allows a further reduction in cost for building a system.

As illustrated in FIG. 2, in a case where degradation in radio wave environment occurs due to a bad weather or the like, the wireless station apparatus 11c installed in a mountainous area is capable of establishing a temporary relay system in response to a control signal given from an external apparatus or in response to a manual control thereby making it possible to relay a wireless communication between the mobile station apparatus 10c and the base station apparatus 12a in a service expanded area. Furthermore, it is also possible to establish a radio-wave environment improved area or an interference reduced area in response to a control signal given from an external apparatus or in response to a manual control, which results in a reduction in transmission power of the mobile station apparatuses 10c and 10d, thereby suppressing the battery consumption.

Because of the capability of receiving a mode switching control signal from an external apparatus other than a base station apparatus, the wireless station apparatuses 11a to 11c are capable of effectively switching their mode to the relay station mode using various kinds of information sources.

(Fourth Embodiment)
(Configuration of Wireless Relay Communication System)

Figure 16:
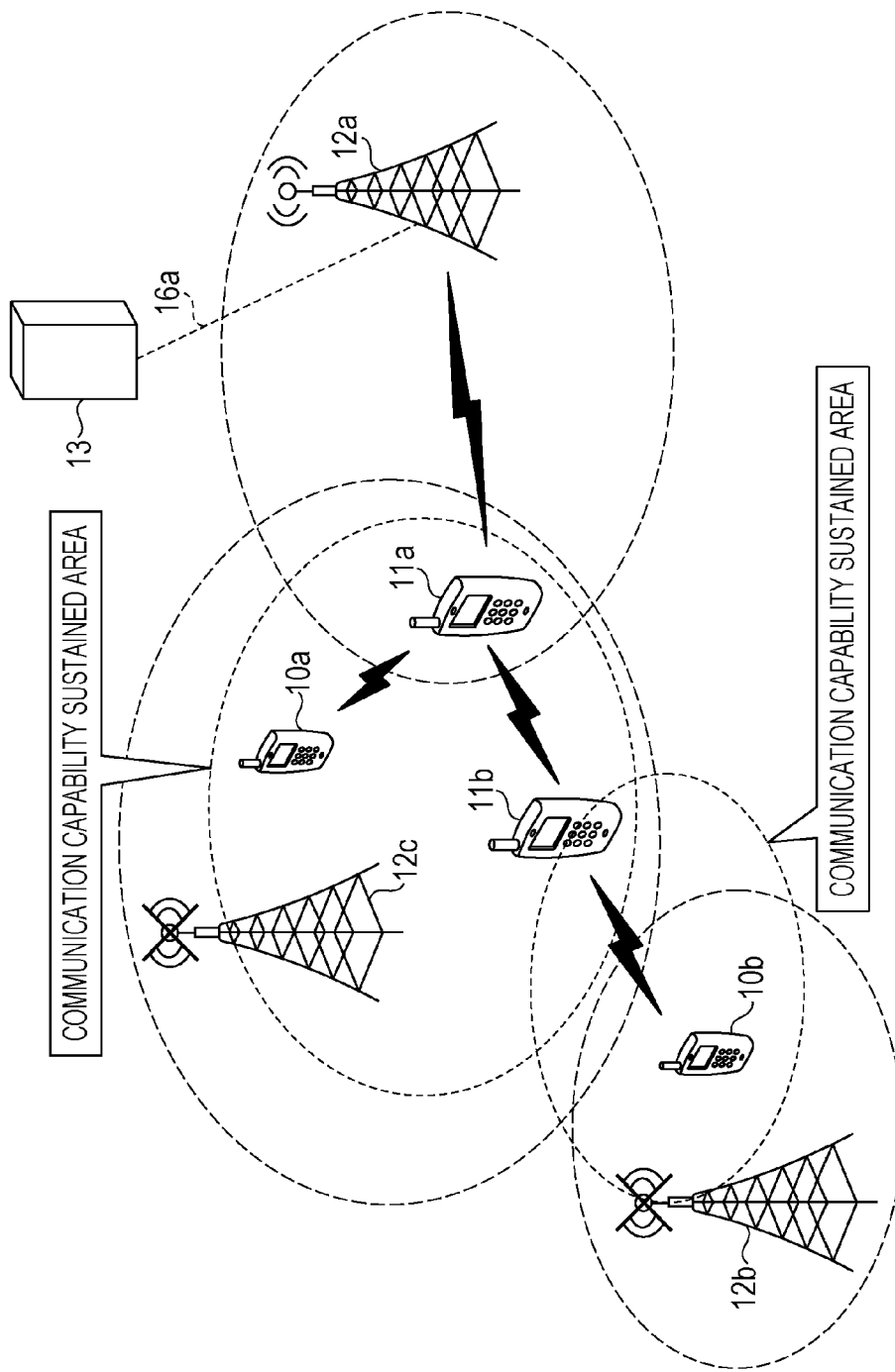
FIG. 16 is a conceptual diagram illustrating an example of a configuration of a wireless relay communication system according to a fourth embodiment of the present invention.
Figure 17:
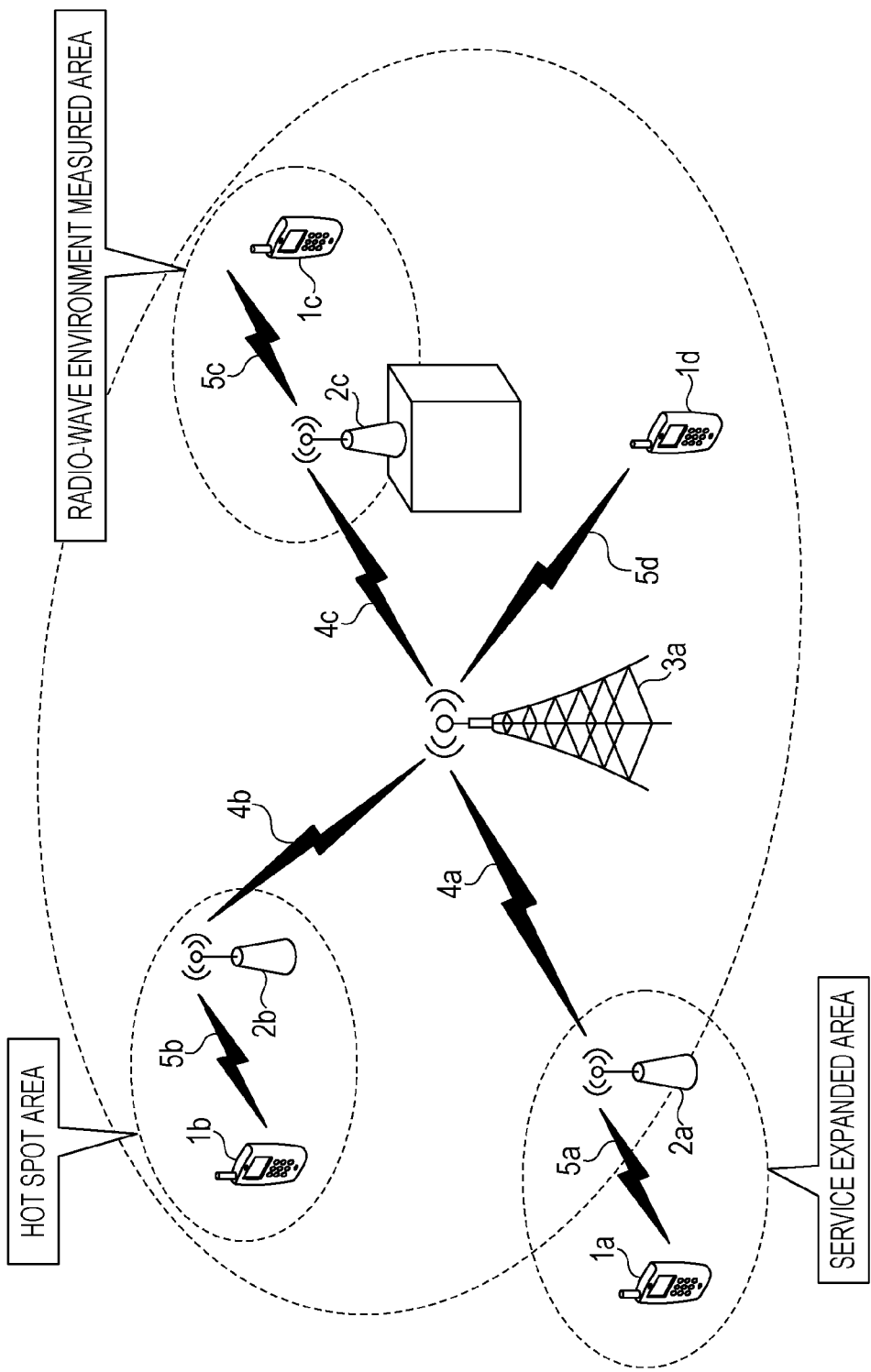
FIG. 17 is a diagram illustrating a LTE relay technology.

FIG. 16 is a conceptual diagram illustrating an example of a configuration of a wireless relay communication system according to a fourth embodiment of the present invention. This wireless relay communication system includes mobile station apparatuses 10a and 10b, wireless station apparatuses 11a and 11b, a base station apparatus 12a, and an MME/S-GW unit 13 serving as a network control unit of the wireless communication system.

A radio signal transmitted and received from or by the mobile station apparatus 10b is related to the base station apparatus 12a via the wireless station apparatuses 11a and 11b. The control of switching of the mode of the wireless station apparatuses 11a and 11b is performed using the control of the switching of the mode according to one of or a combination of the above-described first to third embodiments of the present invention.

(Configuration of Base Station Apparatus)

The base station apparatus 12a according to the fourth embodiment is configured using one of configurations of the base station apparatus 12a according to the first to third embodiments of the present invention. Herein, it is assumed that a configuration similar to that illustrated in FIG. 3 is used, and a further description thereof is omitted.

(Configuration of Wireless Station Apparatus)

The wireless station apparatuses 11a and 11b according to the fourth embodiment of the invention are configured in a manner corresponding to the configuration of the base station apparatus 12a according to the first to third embodiments of the present invention. More specifically, the higher layer processing unit 11a8 includes the mode switching control unit $12a2_1$ of the base station apparatus 12a illustrated in FIG. 3 in addition to the mode switching processing unit $11a8_1$. Configurations are similar to those illustrated in FIG. 4, FIG. 5, or FIG. 14, except for the configuration of the higher layer processing unit 11a8, and thus a further description thereof is omitted here.

(Processing Procedure of Mode Switching Process in Wireless Station Apparatus 11a)

A processing procedure of a mode switching process in the wireless station apparatus 11a according to the fourth embodiment of the present invention uses a processing procedure similar to that used by base station apparatus 12a configured according to the first to third embodiments of the present invention, and thus a further detailed description thereof is omitted.

In the relay station apparatus mode, the wireless station apparatus 11a relays a radio signal from the mobile station apparatus 10a or the wireless station apparatus 11b to the base station apparatus 12a, and thus the wireless station apparatus 11a seems like a base station apparatus eNB when seen from the mobile station apparatus 10a or the wireless station apparatus 11b.

The mode switching control unit $12a2_1$ provided in the higher layer processing unit 11a8 of the wireless station apparatus 11a operates, as described above in the first or second embodiment of the present invention, such that a mode switching control signal is transmitted to the wireless station apparatus 11b using the physical downlink shared channel PDSCH illustrated in FIG. 8.

For example, based on information of a first MBSFN subframe informed to the wireless station apparatus 11a such as that illustrated in FIG. 8, the mode switching processing unit $12a2_1$ of the wireless station apparatus 11a assigns a second MBSFN subframe a downlink subframe number different from a downlink subframe number of the first MBSFN subframe, and the mode switching processing unit $12a2_1$ transmits allocation information to the mobile station apparatus 10b and the wireless station apparatus 11b via the physical broadcast channel PBCH.

According to notified allocation information of the second MBSFN subframe, the mobile station apparatus 10b ignores (does not receive) MBSFN subframes. The wireless station apparatus 11b receives relay data from the wireless station apparatus 11a using the second MBSFN subframe. The wireless station apparatus 11b ignores (does not receive) subframes other than the second MBSFN subframe. The wireless station apparatus 11a receives relay data from the base station apparatus 12a using the first MBSFN subframe. The wireless station apparatus 11a ignores (does not receive) subframes other than the first and second MBSFN subframes.

In a case where the mode of the wireless station apparatus 11b is switched from the mobile station apparatus mode to the relay station apparatus mode, a step associated with the initial connection in relay station apparatus mode and a step associated with the operation in the relay station apparatus mode of the wireless station apparatus 11b are respectively similar to step S25 and S26 in FIG. 7, and thus a description thereof is omitted.

(Advantageous Effects of the Fourth Embodiment of the present invention)

With a combination of the base station apparatus 12a and a plurality of wireless station apparatuses such as the wireless station apparatuses 11a, 11b, or the like according to the fourth embodiment of the present invention, it is possible to add a communication capability sustained area such as that illustrated in FIG. 16. For example, by adding a plurality of communication capability sustained areas, it is possible to sustain communication using the base station apparatus 12a instead of the base station apparatuses 12b and 12c that have lost the communication capability.

With a combination of the base station apparatus 12a and a plurality of wireless station apparatuses such as the wireless station apparatuses 11a, 11b, or the like according to the fourth embodiment of the present invention, it is possible to add a plurality of service expanded areas thereby making it possible to extend a service area of an existing base station apparatus to satisfy demands from users and demands from society.

The above-described processes according to the first to fourth embodiments of the present invention may also be realized by implementing functions of the respective processes on an integrated circuit and controlling the integrated circuit. By disposing such an integrated circuit in the base station apparatuses 12a to 12c, it is possible to realize the operation of the base station apparatus according to the first to fourth embodiments. Furthermore, by disposing such an integrated circuit in the wireless station apparatuses 11a to 11d, it is possible to realize the operation of the wireless station apparatus according to the first to fourth embodiments.

Each process according to any embodiment of the present invention may be realized by a computer program. The computer program is executed by the base station apparatuses 12a to 12c and the wireless station apparatuses 11a to 11d according to the first to fourth embodiments to control a CPU or the like so as to realize each process according to the first to fourth embodiments.

Information treated by these apparatuses is temporarily stored in a RAM during the process, and then stored in a ROM, a HDD, or other various types of rewritable storages. The information is read out by the CPU and subjected to modification or addition of new information as required.

As for a medium for storing the computer program, any of the following may be used: a semiconductor medium (for example, a ROM, a nonvolatile memory cord, or the like); an optical storage medium (for example, DVD, MO, MD, CD, BD, or the like); a magnetic storage medium (for example, a magnetic tape, a flexible disk, or the like) or the like.

Instead of realizing each process according to the embodiments described above by executing the read-out computer program by the CPU, the present invention may also be realized by performing the process in cooperation with an operating system or other application programs or the like in accordance with an instruction of the computer program.

To distribute the computer program in market, the computer program may be stored in a portable storage medium and distributed, or the computer program may be transferred to a server computer connected via a network such as the Internet or the like. In this case, a storage apparatus of the server computer also falls within the scope of the present invention.

Part or all of the wireless station apparatuses 11a to 11d and the base station apparatuses 12a to 12c according to the first to fourth embodiments may be realized an integrated circuit typified by an LSI. The respective functional blocks of the wireless station apparatuses 11a to 11d and the base station apparatuses 12a to 12c may be individually realized on separate chipsets or part or all of functions may be integrated on a chipset. The form of the integrated circuit is not limited to the LSI, but the integrated circuit may be realized in other forms such as a dedicated circuit or a general-purpose processor. When an advance in semiconductor technology makes it possible to realize the integrated circuit in a form other than LSI, the integrated circuit using such technology may be used.

Note that the present invention is not limited to the embodiments described above, but various modifications and alterations are possible without departing from the scope of the invention.

REFERENCE SIGNS LIST 1a to 1d, 10a to 10d mobile station apparatus
2a to 2c relay station apparatus
3a, 12a to 12c base station apparatus
4a to 4c, 14a to 14d wireless backhaul link
5a to 5d, 15a to 15d radio access link
11a to 11d wireless station apparatus
$11a1_1$, $11a1_2$ transmitting/receiving antenna unit
$11a2_1$, $11a2_2$ antenna duplexer
$11a3_1$, $11a3_2$ receiving unit
$11a4_1$, $11a4_2$ transmission unit
11a5 control unit
11a6 demultiplexing unit
11a7 physical channel extraction unit
$11a7_1$ ULRS (Uplink Reference Signals) extraction unit
$11a7_2$ PUCCH (Physical Uplink Control Channel) extraction unit
$11a7_3$ PUSCH (Physical Uplink Shared Channel) extraction unit
$11a7_4$ PRACH (Physical Random Access Channel) extraction unit
$11a7_5$ DLRS (Downlink Reference Signals) extraction unit
$11a7_6$ SS (Synchronization Signals) extraction unit
$11a7_7$ PBCH (Physical Broadcast Channel) extraction unit
$11a7_8$ PDCCH (Physical Downlink Control Channel) extraction unit
$11a7_9$ PDSCH (Physical Downlink Shared Channel) extraction unit
$11a7_{10}$ PCFICH (Physical Control Format Indicator Channel) extraction unit
$11a7_{11}$ PHICH (Physical Hybrid ARQ Indicator Channel) extraction unit
$11a7_{12}$ R-PDCCH (Relay Physical Downlink Control Channel) extraction unit
11a8 higher layer processing unit
$11a8_1$ mode switching processing unit
11a9 physical channel generation unit
$11a9_1$ ULRS (Uplink Reference Signals) generation unit
$11a9_2$ PUCCH (Physical Uplink Control Channel) generation unit
$11a9_3$ PUSCH (Physical Uplink S hared Channel) generation unit $11a9_4$ PRACH (Physical Random Access Channel) generation unit
$11a9_5$ DLRS (Downlink Reference Signals) generation unit
$11a9_6$ SS (Synchronization Signals) generation unit
$11a9_7$ PBCH (Physical Broadcast Channel) generation unit
$11a9_8$ PDCCH (Physical Downlink Control Channel) generation unit
$11a9_9$ PDSCH (Physical Downlink Shared Channel) generation unit
$11a9_{10}$ PCFICH (Physical Control Format Indicator Channel) generation unit
$11a9_{11}$ PHICH (Physical Hybrid ARQ Indicator Channel) generation unit
$11a10$ multiplexing unit
$12a1$ interface unit
$12a2$ higher layer processing unit
$12a2_1$ mode switching control unit
$12a3$ physical channel extraction unit
$12a3_1$ ULRS (Uplink Reference Signals) extraction unit
$12a3_2$ PUCCH (Physical Uplink Control Channel) extraction unit
$12a3_3$ PUSCH (Physical Uplink Shared Channel) extraction unit
$12a3_4$ PRACH (Physical Random Access Channel) extraction unit
$12a4$ multiplexing unit
$12a5$ transmission unit
$12a6$ transmitting antenna unit
$12a7$ receiving antenna unit
$12a8$ receiving unit
$12a9$ demultiplexing unit
$12a10$ physical channel generation unit
$12a10_1$ DLRS (Downlink Reference Signals) generation unit
$12a10_2$ SS (Synchronization Signals) generation unit
$12a10_3$ PBCH (Physical Broadcast Channel) generation unit
$12a10_4$ PDCCH (Physical Downlink Control Channel) generation unit
$12a10_5$ PDSCH (Physical Downlink Shared Channel) generation unit
$12a10_6$ PCFICH (Physical Control Format Indicator Channel) generation unit
$12a10_7$ PHICH (Physical Hybrid ARQ Indicator Channel) generation unit
$12a10_8$ R-PDCCH (Relay Physical Downlink Control Channel) generation unit
$12a11$ control unit
$13$ MME/S-GW unit

The invention claimed is:

1. A wireless station apparatus comprising:
higher layer processing circuitry that generates a control message including capability information that indicates a capability to relay communication with a base station apparatus;
transmission circuitry that transmits the control message to the base station apparatus;
reception circuitry that receives a mode switching control signal from the base station apparatus, the mode switching control signal causing a mode to switch either to a first mode in which the wireless station apparatus communicates with only the base station apparatus or to a second mode in which the wireless station apparatus communicates with a mobile station apparatus;
mode switching processing circuitry that switches the mode either to the first mode or to the second mode; and
control circuitry that, in the first mode, communicates with only the base station apparatus, and, in the second mode, communicates with the mobile station apparatus.

2. A base station apparatus comprising:
reception circuitry that receives a control message including capability information that indicates a capability to relay communication with the base station apparatus from a wireless station apparatus; and
higher layer processing circuitry that generates a mode switching control signal based on the capability information, the mode switching control signal causing a mode of the wireless station apparatus to switch either to a first mode in which the wireless station apparatus communicates with only the base station apparatus or to a second mode in which the wireless station apparatus communicates with a mobile station apparatus.

3. A method for operating a wireless station apparatus comprising:
generating a control message including capability information that indicates a capability to relay communication with a base station apparatus;
transmitting the control message to the base station apparatus;
receiving a mode switching control signal from the base station apparatus, the mode switching control signal causing a mode to switch either to a first mode in which the wireless station apparatus communicates with only the base station apparatus or to a second mode in which the wireless station apparatus communicates with a mobile station apparatus;
switching the mode either to the first mode or to the second mode; and
communicating, in the first mode, with only the base station apparatus, and, in the second mode, communicating with the mobile station apparatus.

* * * * *